United States Patent [19]
Wright et al.

[11] Patent Number: 5,827,188
[45] Date of Patent: Oct. 27, 1998

[54] METHOD AND APPARATUS FOR RECEIVE BEAMFORMER SYSTEM

[75] Inventors: J. Nelson Wright, Menlo Park; Christopher R. Cole, Cupertino; Albert Gee, Los Altos, all of Calif.

[73] Assignee: Acuson Corporation, Mountain View, Calif.

[21] Appl. No.: 788,206

[22] Filed: Jan. 24, 1997

Related U.S. Application Data

[60] Division of Ser. No. 432,615, May 2, 1995, Pat. No. 5,685,308, which is a continuation-in-part of Ser. No. 286,658, Aug. 5, 1994, abandoned.

[51] Int. Cl.$^6$ ........................................................ A61B 8/00
[52] U.S. Cl. ............................................... 600/447; 73/625
[58] Field of Search ...................... 128/660.07, 661.01, 128/661.09; 73/625–626; 367/104–105; 600/443, 447, 459

[56] References Cited

U.S. PATENT DOCUMENTS

| | | |
|---|---|---|
| 3,370,266 | 2/1968 | Taddeo et al. |
| 3,710,330 | 1/1973 | Waters. |
| 3,805,596 | 4/1974 | Klahr ........................................ 73/67.8 |
| 3,860,928 | 1/1975 | Erlich. |
| 4,140,022 | 2/1979 | Maslak ...................................... 73/626 |
| 4,154,113 | 5/1979 | Engeler ...................................... 73/626 |
| 4,155,258 | 5/1979 | Engeler et al. ............................ 73/626 |
| 4,155,259 | 5/1979 | Engeler ...................................... 73/626 |
| 4,155,260 | 5/1979 | Engeler et al. ............................ 73/626 |
| 4,170,766 | 10/1979 | Pridham et al. . |
| 4,180,790 | 12/1979 | Thomas ..................................... 367/7 |
| 4,484,477 | 11/1984 | Buxton ...................................... 73/626 |
| 4,550,607 | 11/1985 | Maslak et al. ............................ 73/626 |
| 4,662,223 | 5/1987 | Riley et al. ................................ 73/626 |
| 4,669,314 | 6/1987 | Magrane ................................... 73/610 |
| 4,691,570 | 9/1987 | Hassler ...................................... 73/626 |
| 4,699,009 | 10/1987 | Maslak et al. ............................ 73/626 |

(List continued on next page.)

OTHER PUBLICATIONS

Beamforming, Dan E. Dudgeon & Russell M. Mersereau, *Multidimensional Digital Signal Processing*, Section 6.2, Prentice Hall, 1984.

Digital Signal Processing for Sonar, William C. Knight, Roger G. Pridham. Steven M. Kay, *Proceedings of the IEEE*, vol. 69, No. 11, Nov., 1981.

Digital Time Delay Beamforming, Roger Pridham, *Signal Processing Handbook*, edited by C.H. Chen, 1988.

Fundamentals of Digital Array Processing, Dan E. Dudgeon, *Proceedings of the IEEE*, vol. 65, No. 6, Jun. 1977.

(List continued on next page.)

*Primary Examiner*—Francis Jaworski
*Attorney, Agent, or Firm*—Brinks Hofer Gilson & Lione

[57] ABSTRACT

The present invention includes a fully programmable plurality of multi-channel receivers, each receiver having a digital multi-channel receive processor and a local processor control. Each receive processor includes a first decimator, time delay memory, second decimator, and complex multiplier. The receive beamformer is a computationally efficient system which is programmable to allow processing mode trade-offs among receive frequency, receive spatial range resolution, and number of simultaneous beams received. Each local control receives focusing data from a central control computer and provides final calculation of per-channel dynamic focus delay, phase, apodization, and calibration values for each receiver signal sample. Further, this invention includes a baseband multi-beam processor which has a phase aligner and a baseband filter for making post-beamformation coherent phase adjustments and signal shaping, respectively. The phase aligner maintains scan-line-to-scan-line coherency, such as would be required for coherent image formation. Accordingly, the present system can operate under multiple imaging formats, using a variety of transducers and a variety of modes such as B-mode, M-mode, and color Doppler flow mode.

33 Claims, 15 Drawing Sheets

Microfiche Appendix Included
(195 Microfiche, 19058 Pages)

U.S. PATENT DOCUMENTS

| | | |
|---|---|---|
| 4,733,562 | 3/1988 | Saugeon .................................... 73/626 |
| 4,787,392 | 11/1988 | Saugeon .................................... 73/625 |
| 4,809,184 | 2/1989 | O'Donnell et al. ................ 364/413.25 |
| 4,829,491 | 5/1989 | Saugeon et al. ........................ 367/103 |
| 4,831,601 | 5/1989 | Breimesser et al. ...................... 367/88 |
| 4,839,652 | 6/1989 | O'Donnell et al. ..................... 341/122 |
| 4,886,069 | 12/1989 | O'Donnell . |
| 4,893,284 | 1/1990 | Magrane .................................... 367/12 |
| 4,896,287 | 1/1990 | O'Donnell et al. ...................... 364/754 |
| 4,974,558 | 12/1990 | Katakura et al. ......................... 73/626 |
| 4,975,885 | 12/1990 | Hassler et al. .............................. 367/7 |
| 4,983,970 | 1/1991 | O'Donnell et al. ..................... 341/122 |
| 5,005,419 | 4/1991 | O'Donnell et al. ....................... 73/626 |
| 5,014,710 | 5/1991 | Maslak et al. ..................... 128/660.05 |
| 5,014,712 | 5/1991 | O'Donnell et al. ............... 128/661.01 |
| 5,047,769 | 9/1991 | Engeler et al. .......................... 341/118 |
| 5,047,770 | 9/1991 | Engeler et al. .......................... 341/120 |
| 5,105,814 | 4/1992 | Drukarev et al. . |
| 5,111,695 | 5/1992 | Engeler et al. ........................... 73/626 |
| 5,117,238 | 5/1992 | Silverstein et al. . |
| 5,121,364 | 6/1992 | O'Donnell ............................... 367/98 |
| 5,140,558 | 8/1992 | Harrison, Jr. et al. .................... 367/11 |
| 5,142,649 | 8/1992 | O'Donnell ................................. 367/7 |
| 5,165,413 | 11/1992 | Maslak et al. ..................... 128/660.05 |
| 5,203,335 | 4/1993 | Noujaim et al. ................... 128/660.01 |
| 5,218,869 | 6/1993 | Hummer .................................... 73/629 |
| 5,228,007 | 7/1993 | Murakami et al. ..................... 367/103 |
| 5,230,340 | 7/1993 | Rhyne ................................ 128/661.01 |
| 5,231,573 | 7/1993 | Takanizawa ....................... 364/413.25 |
| 5,235,982 | 8/1993 | O'Donnell ........................ 128/660.07 |
| 5,249,578 | 10/1993 | Karp et al. ......................... 128/661.01 |
| 5,276,654 | 1/1994 | Mallart et al. .............................. 367/7 |
| 5,301,674 | 4/1994 | Erikson et al. .................... 128/661.01 |
| 5,329,930 | 7/1994 | Thomas, III ....................... 128/661.01 |
| 5,345,426 | 9/1994 | Lipschutz ................................ 367/123 |
| 5,388,079 | 2/1995 | Kim et al. .......................... 128/661.01 |
| 5,457,996 | 10/1995 | Kondo et al. . |
| 5,462,057 | 10/1995 | Hunt et al. . |
| 5,469,851 | 11/1995 | Lipschutz . |
| 5,477,859 | 12/1995 | Engeler . |
| 5,488,588 | 1/1996 | Engeler et al. . |
| 5,509,415 | 4/1996 | Saunders et al. .................. 128/660.07 |
| 5,515,727 | 5/1996 | Miwa et al. . |
| 5,554,655 | 9/1996 | Wright . |
| 5,600,675 | 2/1997 | Engeler . |

OTHER PUBLICATIONS

The Development of an Ultrasound Diagnostic System with the Ability of Parallel Signal Receiving Using Digital Beam Formers, Hirama, et al., Article 63V–1, Japan Medical Ultrasound Conference, Nov. 1993.

Digital Beamforming Antennas; An Introduction, Hans Steyskal *Microwave Journal,* Jan. 1987.

Acoustic Imaging for Nondestructive Evaluation, Gordon S. Kino, *Proceedings of the IEEE,* vol. 67, pp. 510–525, Apr. 1979.

*Acuson 128 Computer Sonography Systems Service Manual,* pp. 13–32, 113–125, Acuson Corp. Aug. 1989.

Underwater Acoustic Imaging, Jerry L. Sutton, *Proceedings of the IEEE,* vol. 67, pp. 554–556, Apr., 1979.

Digital Beamforming for Radar, P. Barton, *Proceedings of the IEEE,* vol. 127, pt. F, No. 4, Aug. 1980.

A Digital Synthetic Focus Acoustic Imaging System. P.D. Carl, G.S. Kino, C.S. Desilets, and P.M. Grant, *Acoustic Imaging,* vol. 8, 1978.

Digital Beamforming in Ultrasound, B.D. Steinberg, *IEEE Transactions of Ultrasonics, Ferroelectronics, and Frequency Control,* vol. 39, Nov. 1992.

Multirate Digital Signal Processing, Ronald E. Crochiere and Lawrence R. Rabiner, Prentice–Hall, 1983.

Digital Signal Processing Applications Using the ADSP–2100 Family, vol. 1, Amy Mar, ed., Prentice–Hall, 1992.

A Novel Approach to Digital Beamforming, Roger Pridham and Ronald A. Mucci, *Journal of the Acoustical Society of America,* vol. 63, Feb. 1978.

Digital Interpolation Beamforming for Low Pass and Band Pass Signals, Roger G. Pridham and Ronald A. Mucci, *Proceedings of the IEEE,* vol. 67, Jun. 1979.

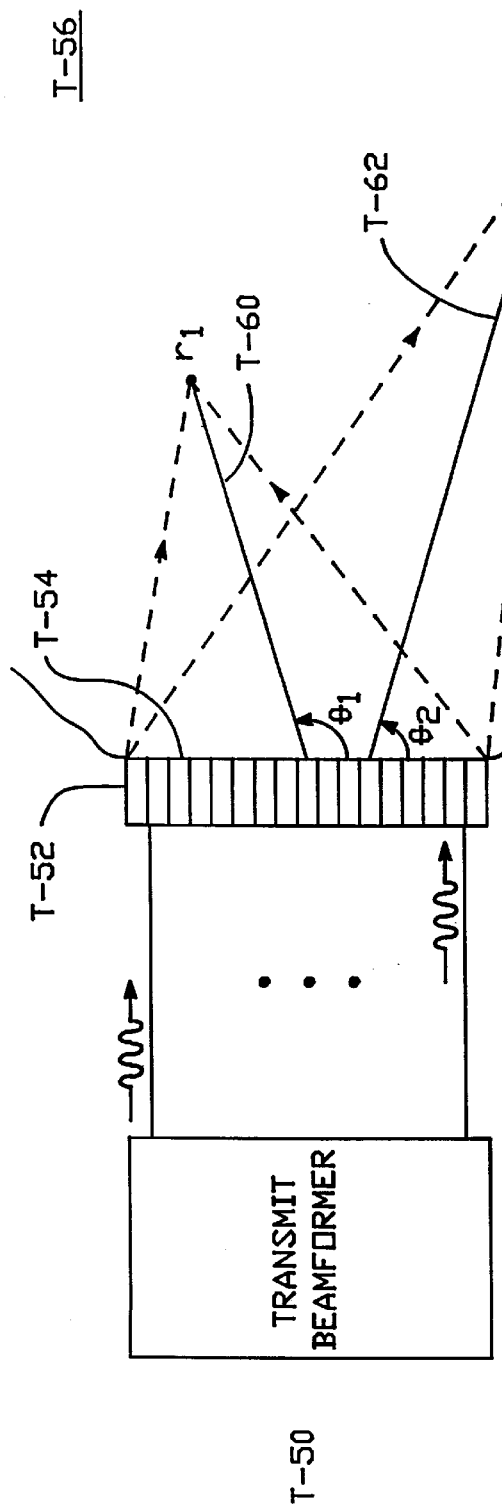
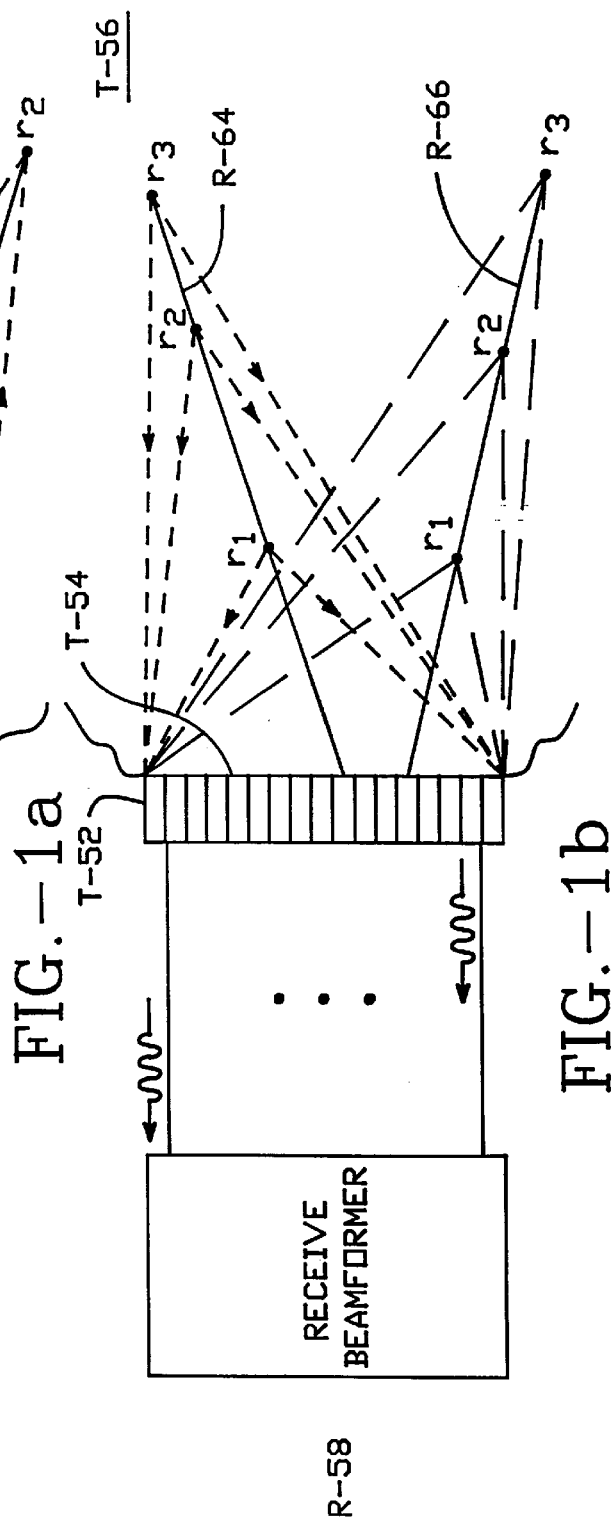
FIG.-1a
FIG.-1b

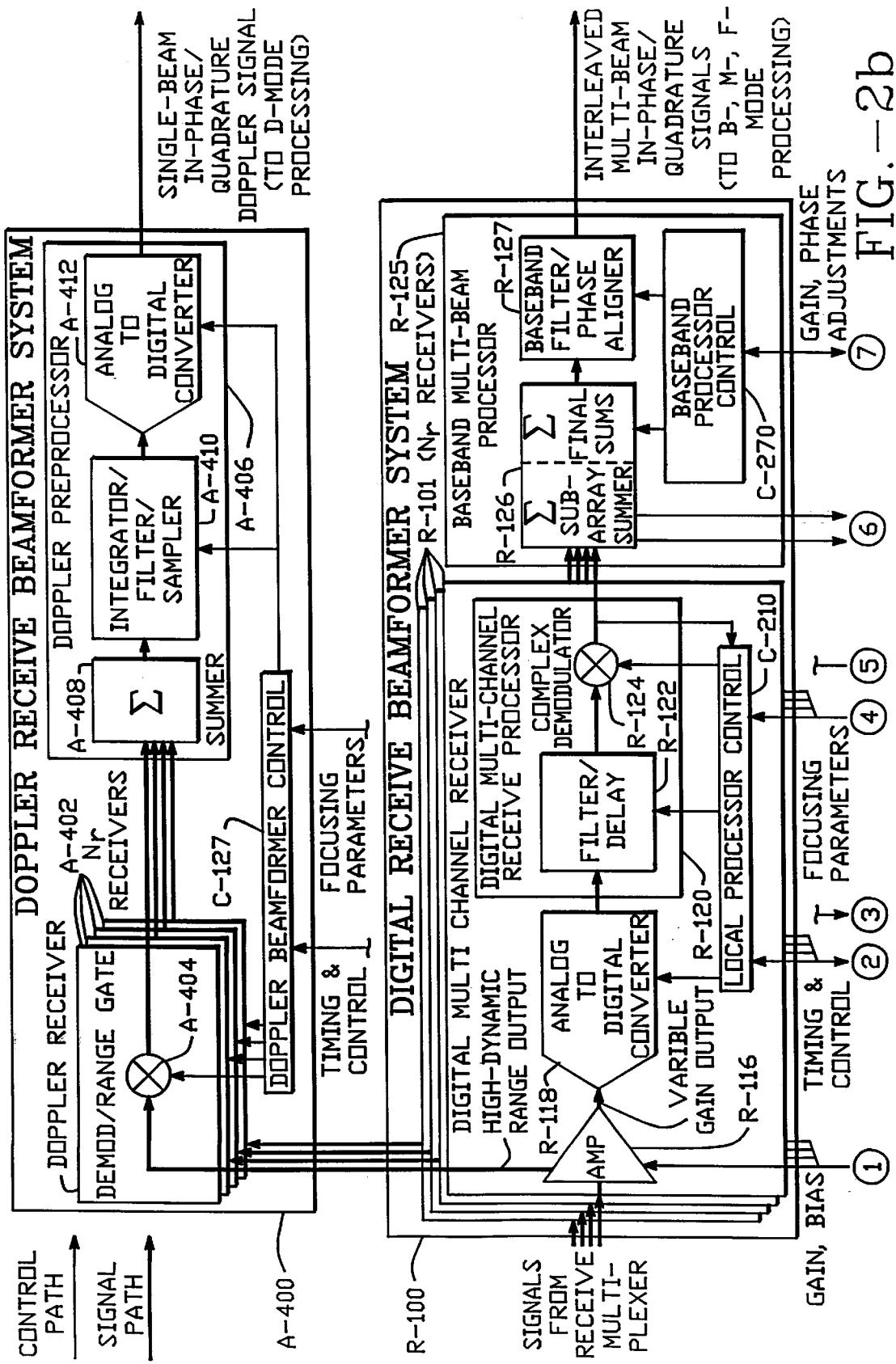
FIG.—2b

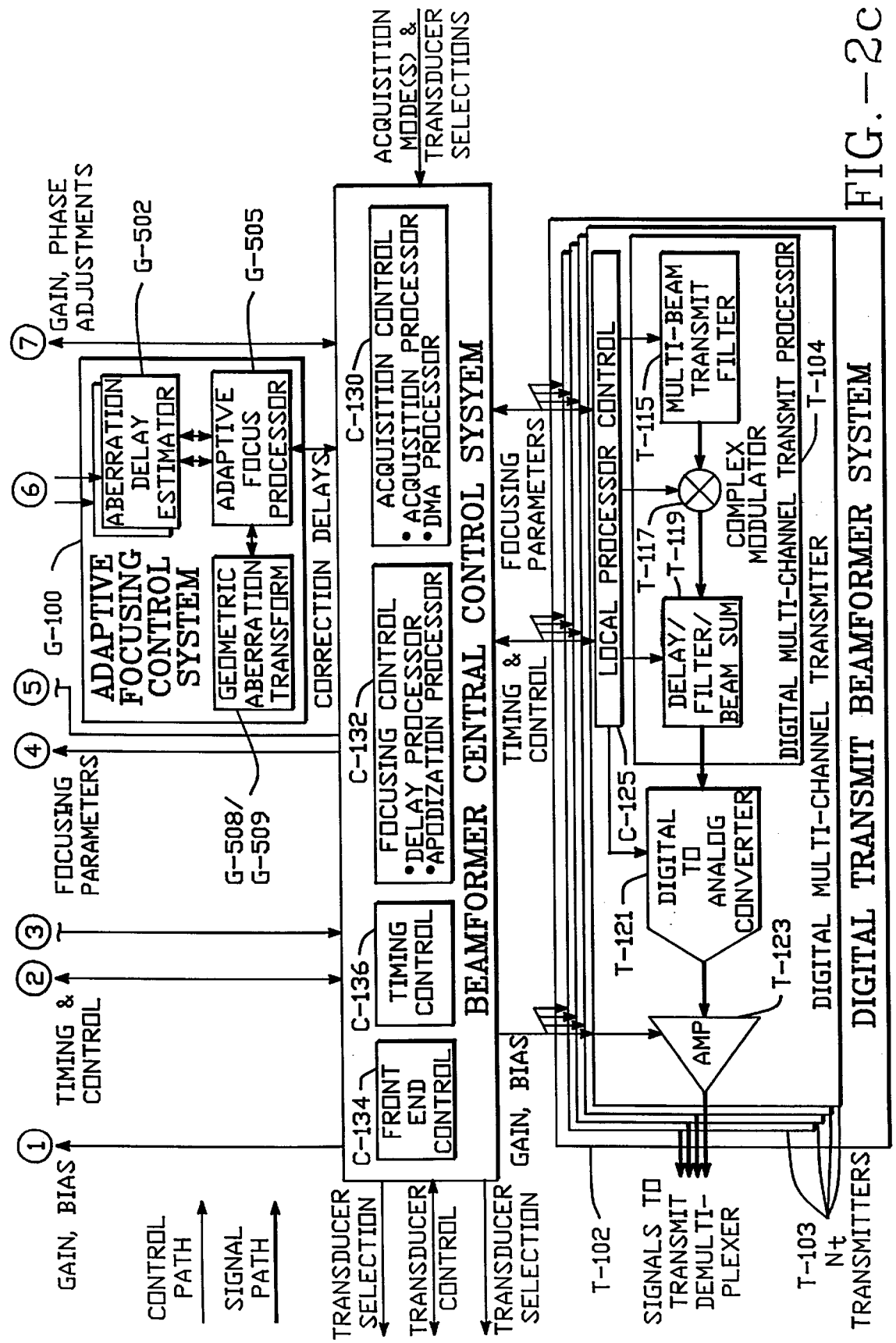

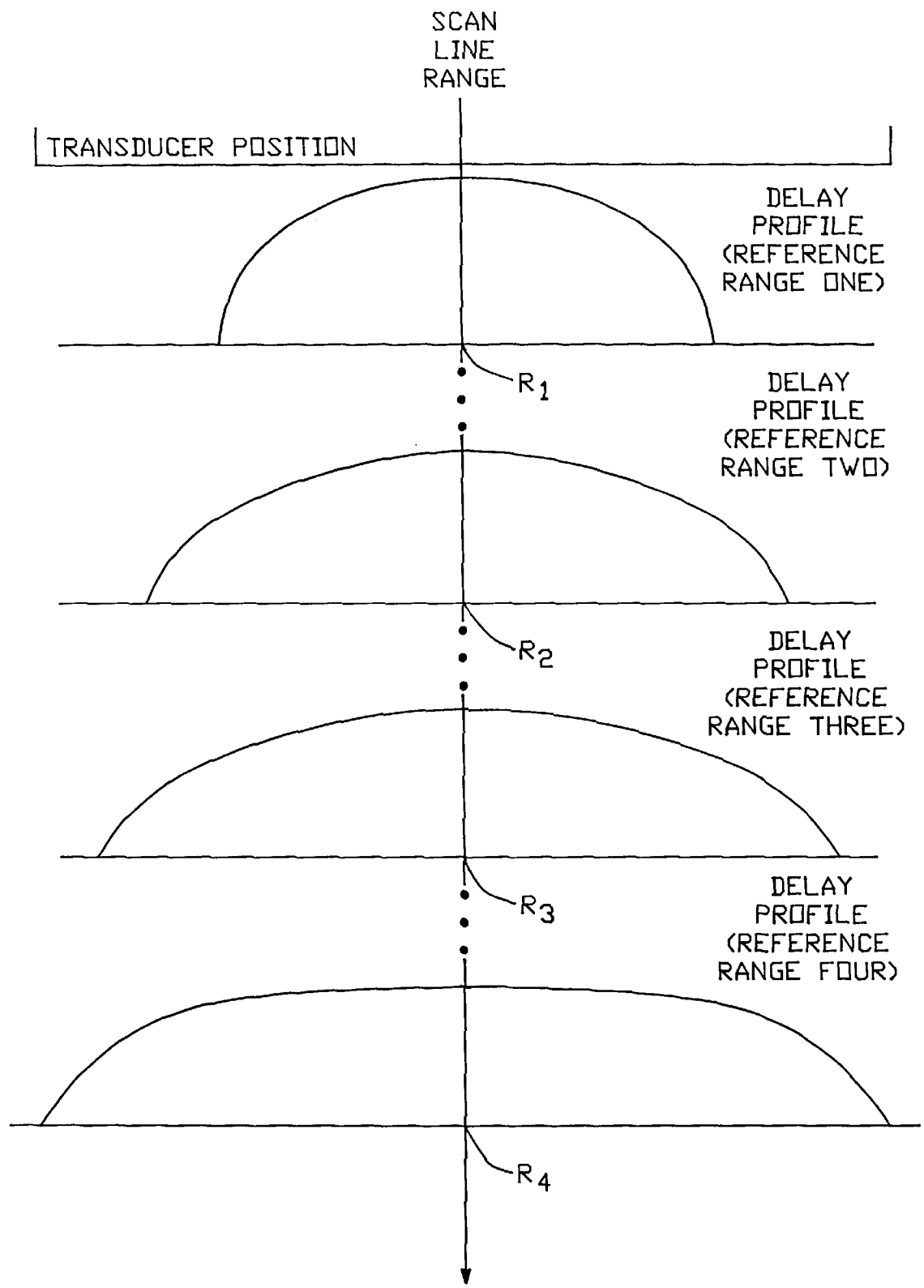
FIG.—5c

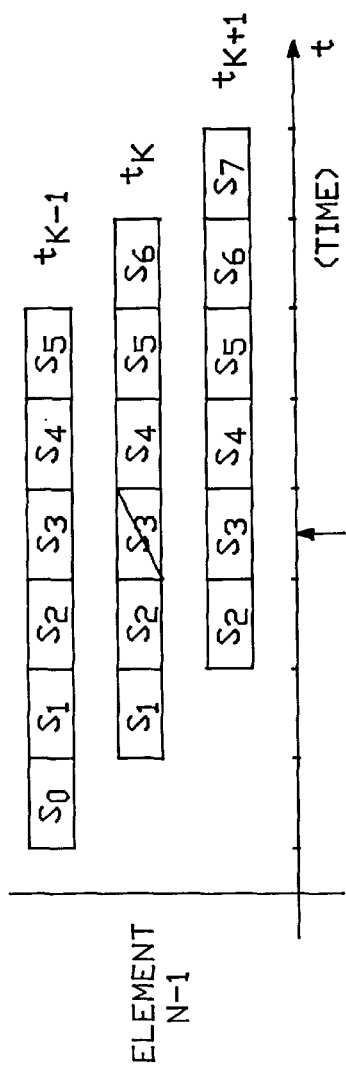
FIG.—6a
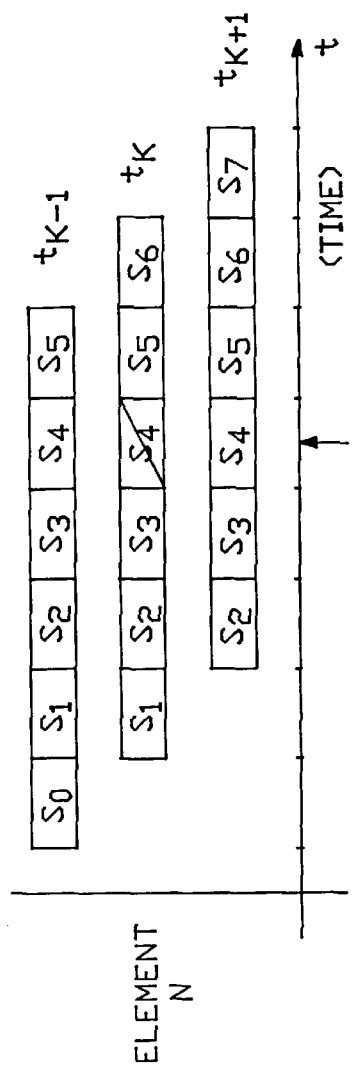
FIG.—6b
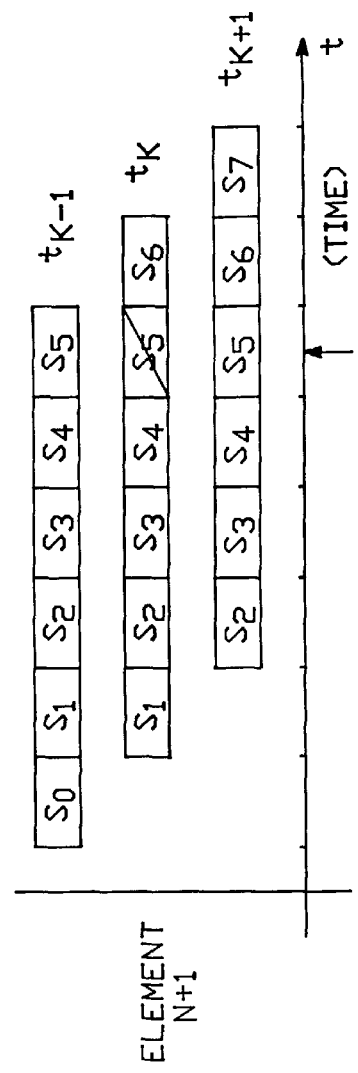
FIG.—6c

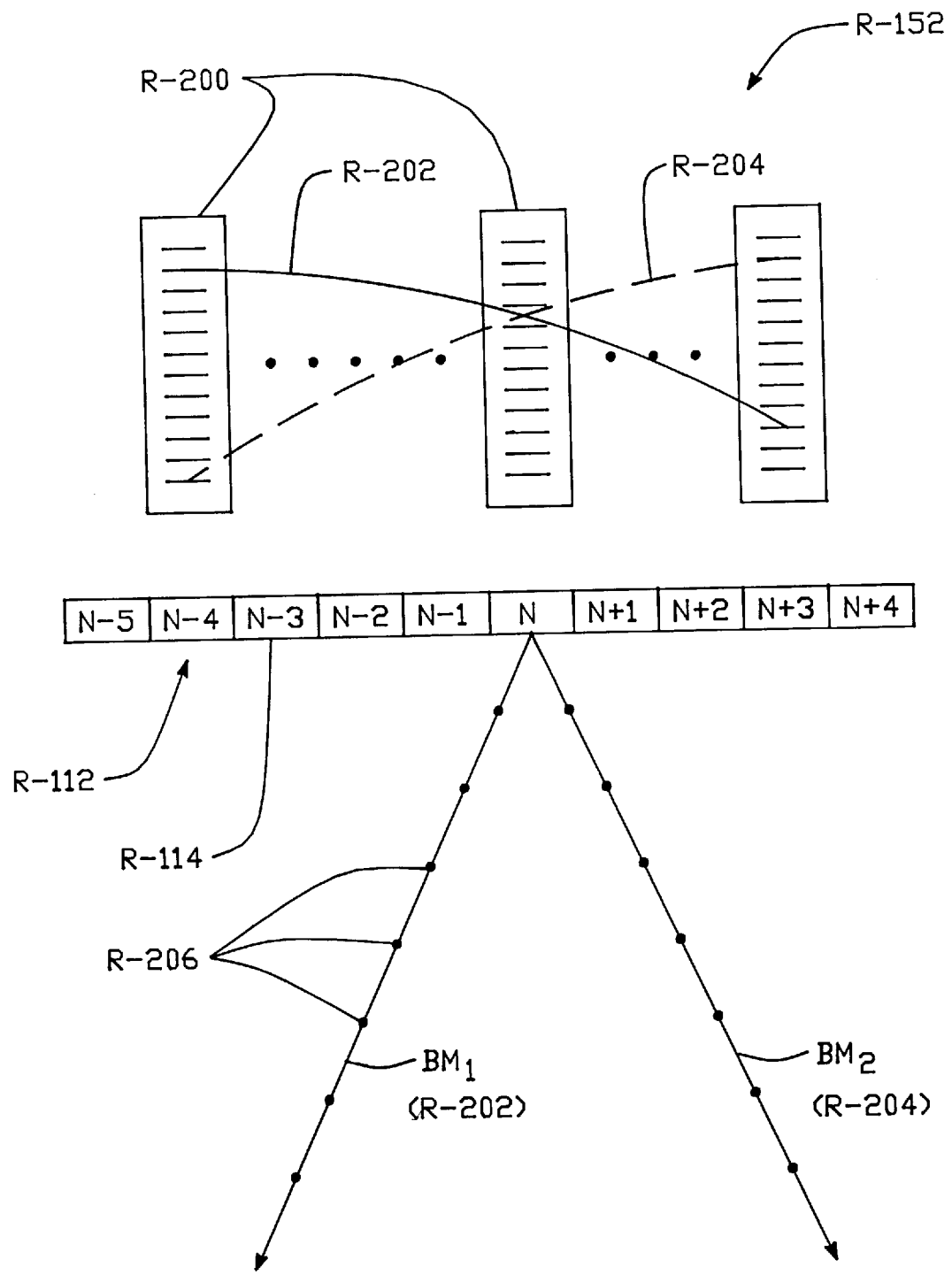
FIG.—7

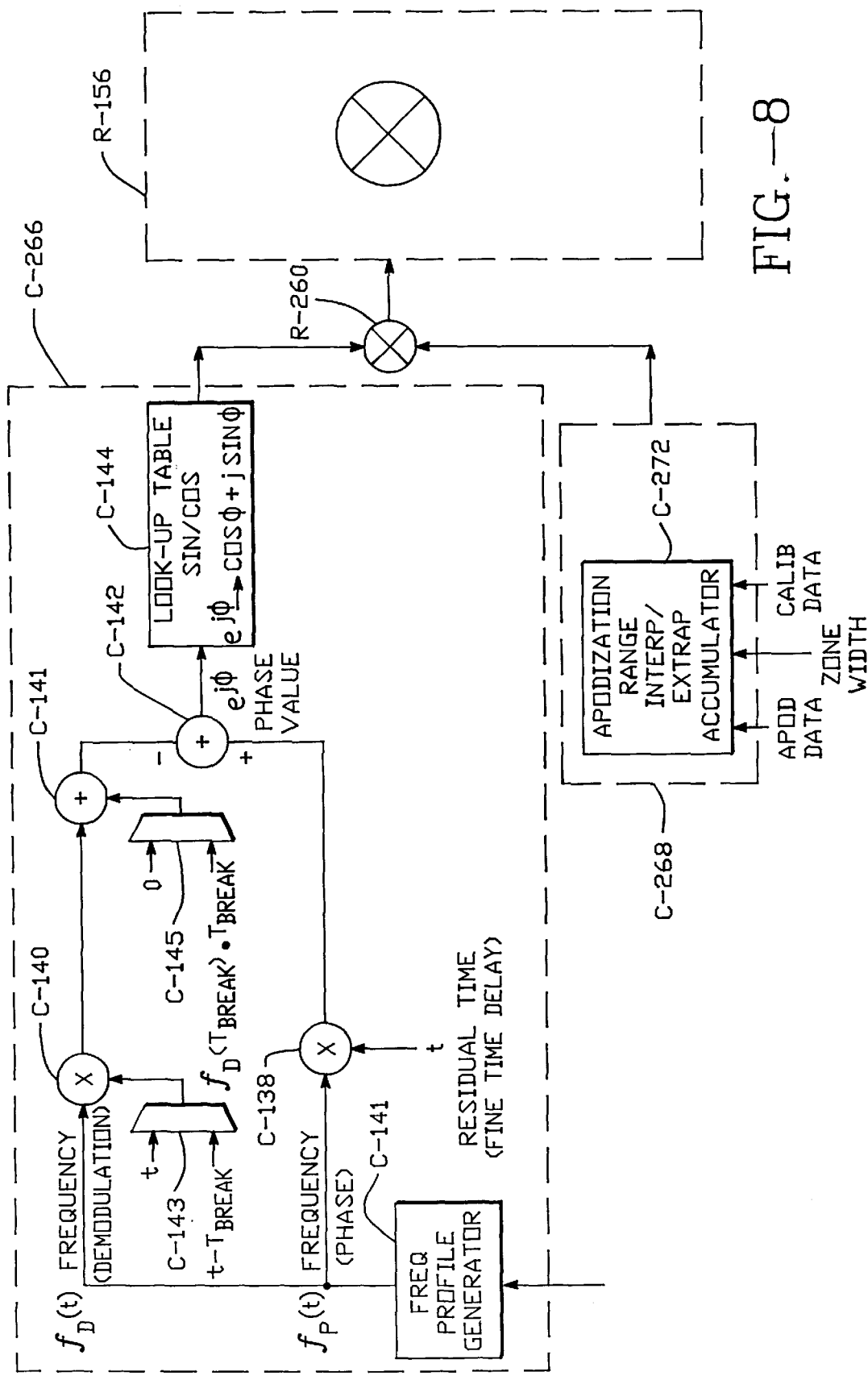
FIG.—8

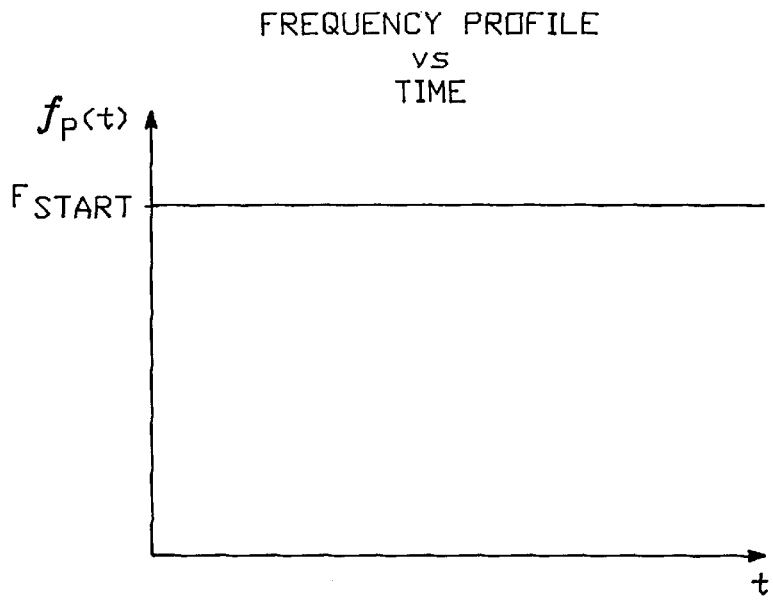
FIG.—10a
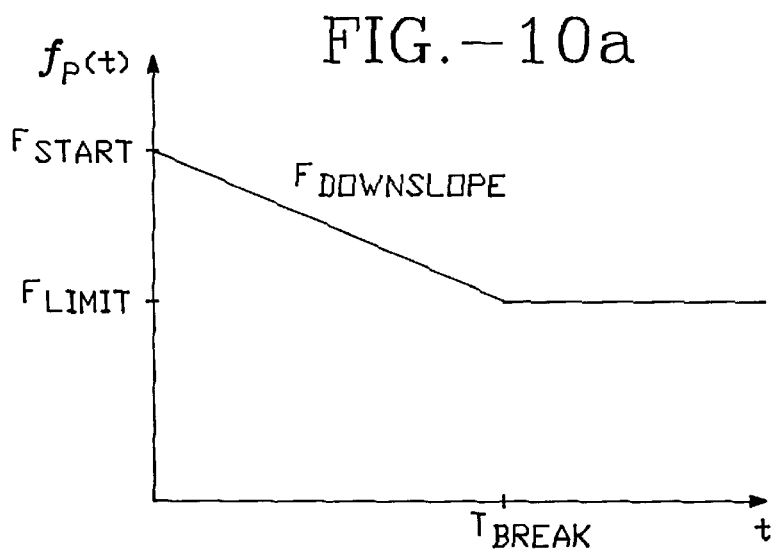
FIG.—10b
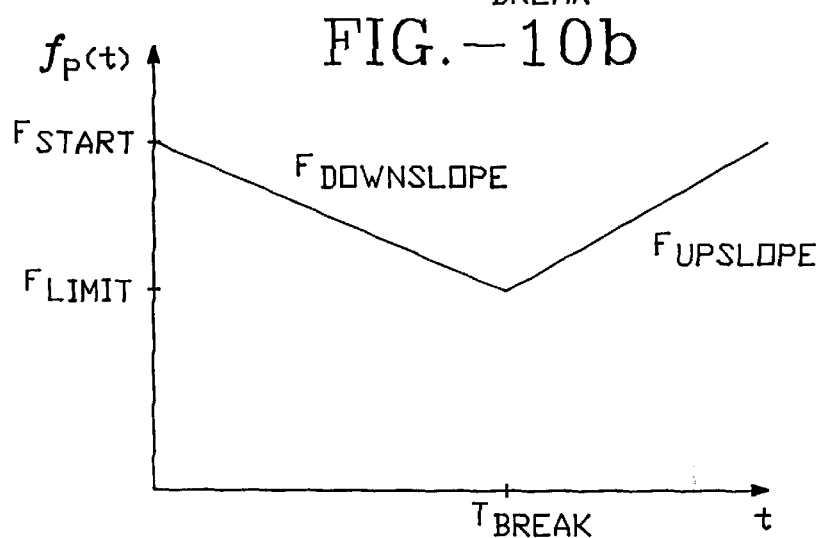
FIG.—10c

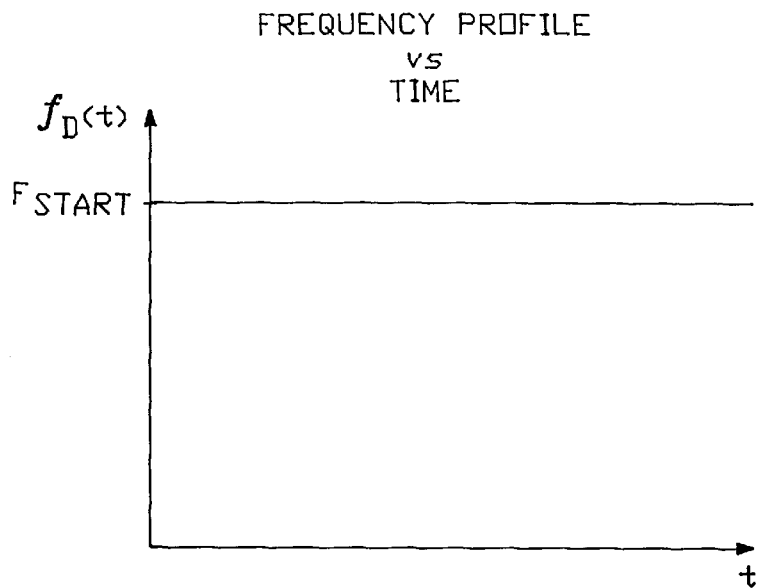
FIG.—10d
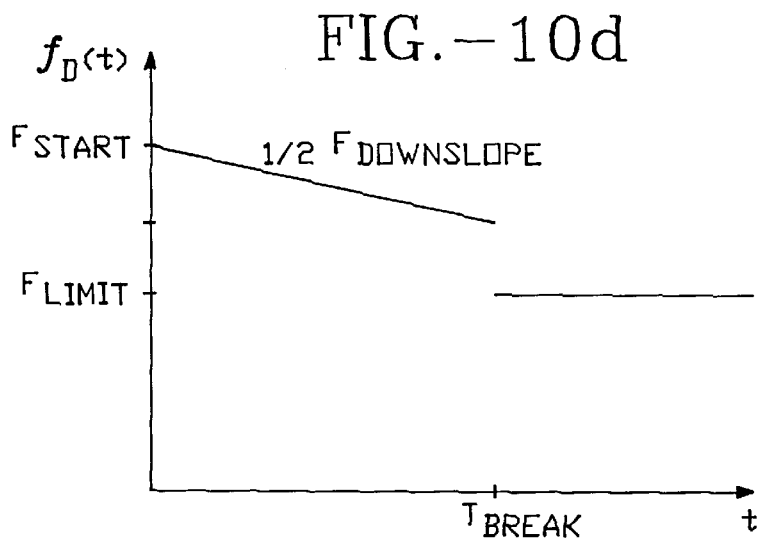
FIG.—10e
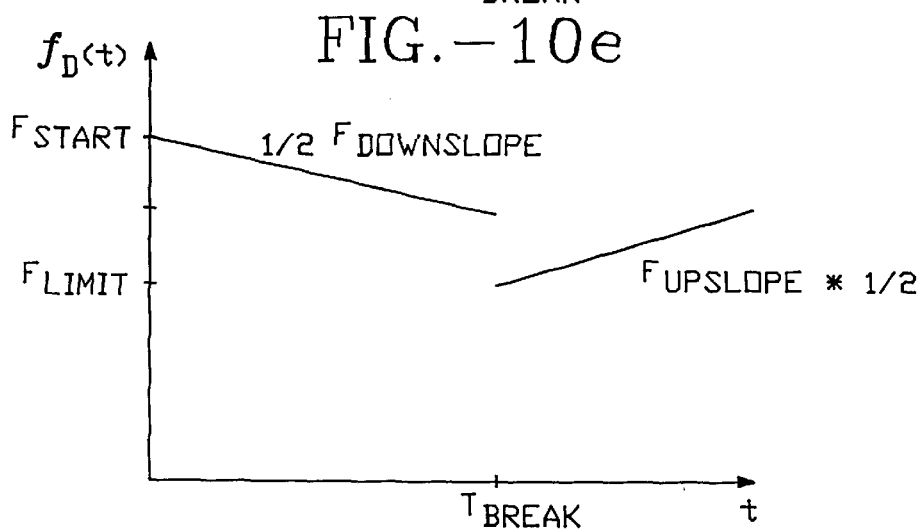
FIG.—10f

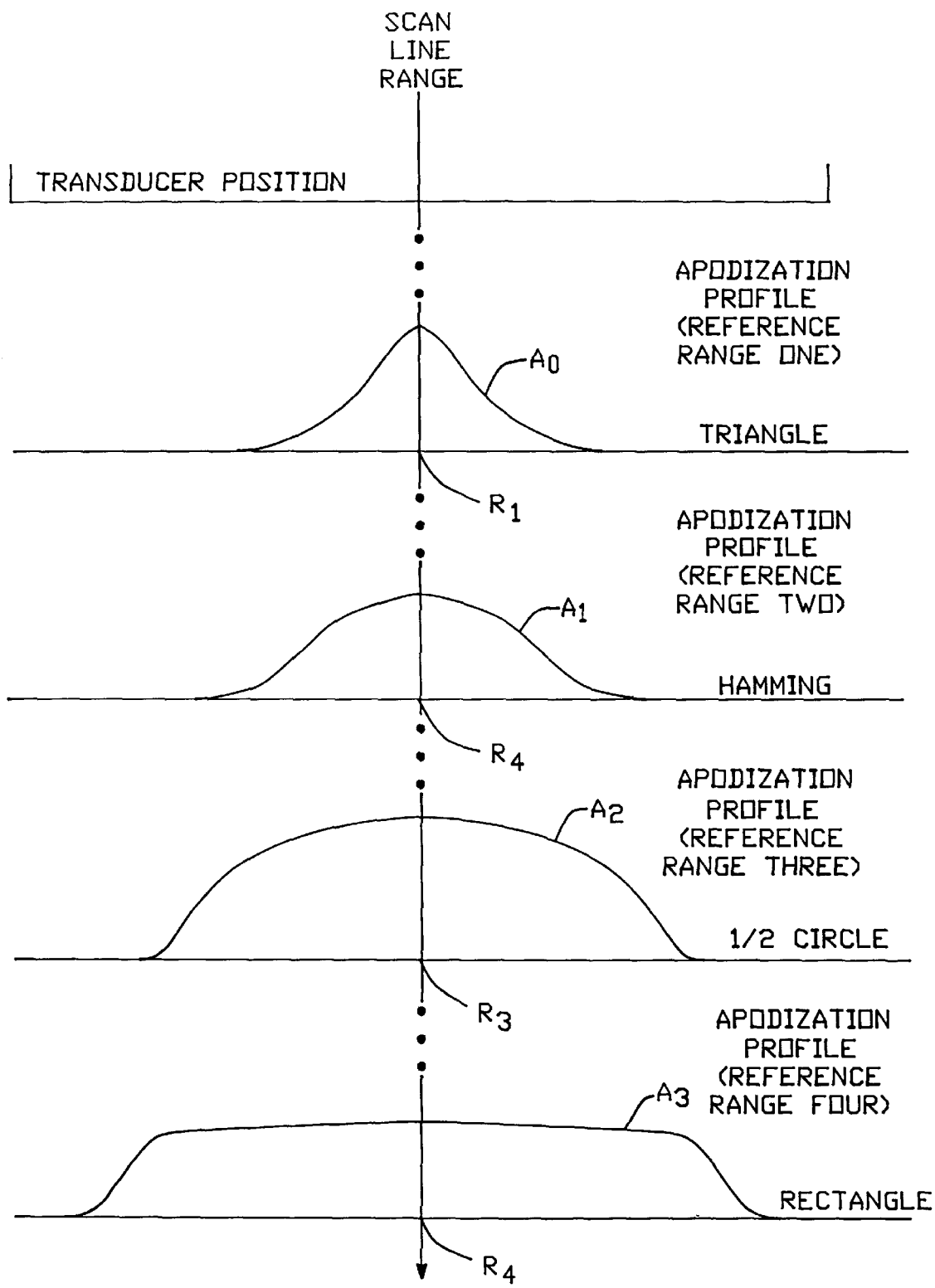
FIG.—11

METHOD AND APPARATUS FOR RECEIVE BEAMFORMER SYSTEM

REFERENCE TO RELATED APPLICATION

This application is a divisional Ser. No. 08/432,615 filed May 2, 1995 and now U.S. Pat. No. 5,685,308, continuation in part of Ser. No. 08/286,658 filed Aug. 5, 1994, and now abandoned.

REFERENCE TO MICROFICHE APPENDIX

This application includes a microfiche appendix of 195 sheets of microfiche having 19,058 frames. A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

CROSS-REFERENCE TO RELATED APPLICATIONS

This application is related to:

a. METHOD AND APPARATUS FOR TRANSMIT BEAMFORMER SYSTEM, Cole et al., Attorney Docket No. 5055-78;

b. METHOD AND APPARATUS FOR FOCUS CONTROL OF TRANSMIT AND RECEIVE BEAMFORMER SYSTEMS, Gee et al., Attorney Docket No. 5055-79;

c. METHOD AND APPARATUS FOR DOPPLER RECEIVE BEAMFORMER SYSTEM, Maslak et al., Attorney Docket No. 5055-80;

d. METHOD AND APPARATUS FOR ADJUSTABLE FREQUENCY SCANNING IN ULTRASOUND IMAGING, Wright et al., Attorney Docket No. 5055-83;

e. METHOD AND APPARATUS FOR A BASEBAND PROCESSOR OF A RECEIVE BEAMFORMER SYSTEM, Wright et al., Attorney Docket No. 5055-84;

f. METHOD AND APPARATUS FOR BEAMFORMER SYSTEM WITH VARIABLE APERTURE, Cole et al., Attorney Docket No. 5055-85.

The above applications are all commonly assigned with the present application, filed concurrently with the present application, and are incorporated herein by reference in their entirety.

The present application is also related to the following previously filed applications:

a. METHOD AND APPARATUS FOR REAL-TIME, CONCURRENT ADAPTIVE FOCUSING IN AN ULTRASOUND BEAMFORMER IMAGING SYSTEM, Wright et al., Ser. No. 08/286,528, filed Aug. 5, 1994;

b. METHOD AND APPARATUS FOR A GEOMETRIC ABERRATION TRANSFORM IN AN ADAPTIVE FOCUSING ULTRASOUND BEAMFORMER SYSTEM, Wright et al., Ser. No. 08/286,664, filed Aug. 5, 1994;

c. METHOD AND APPARATUS FOR COHERENT IMAGE FORMATION, Wright et al., Ser. No. 08/286,510, filed Aug. 5, 1994.

I. FIELD OF THE INVENTION

This invention relates to coherent imaging systems including, for example, radar, sonar, seismic, and ultrasound systems, using vibratory energy, and in particular, but not limited to, phased array ultrasound imaging systems for scan formats such as linear, steered linear, sector, circular, Vector®, steered Vector® and other types of scan formats in imaging modes such as, by way of example only, B-mode (gray-scale imaging mode), F-mode (flow or color Doppler imaging mode), M-mode (motion mode) and D-mode (spectral Doppler mode). Although the invention will be discussed with respect to an ultrasound system, the invention can be implemented with other types of coherent imaging systems.

II. BACKGROUND OF THE INVENTION

A. Literature:

The open literature, which presents issues relevant to imaging systems in general, includes the following documents which are incorporated herein by reference:

1. Dan E. Dudgeon, "Fundamentals of Digital Array Processing," *Proceedings of the IEEE,* volume 65, pp. 898–904, June 1977.

2. Dan E. Dudgeon and Russell M. Mersereau, *Multidimensional Digital Signal Processing,* Chapter 6, Section 2: "Beamforming," Prentice Hall, 1984.

3. William C. Knight, Roger G. Pridham, and Steven M. Kay, "Digital Signal Processing for Sonar," *Proceedings of the IEEE,* volume 69, pages 1451–1506, November 1981. (Digital beamformers for use in sonar described on pages 1465–1471.)

4. Roger G. Pridham and Ronald A. Mucci, "A Novel Approach to Digital Beamforming," *Journal of the Acoustical Society of America,* volume 63, pages 425–434, February 1978.

5. Roger G. Pridham and Ronald A. Mucci, "Digital Interpolation Beamforming for Low-Pass and Bandpass Signals," *Proceedings of the IEEE,* volume 67, pages 904–919, June 1979.

6. P. Barton, "Digital Beamforming for Radar," *IEE Proceedings,* volume 127, part F, number 4, August 1980.

7. P. D. Carl, G. S. Kino, C. S. Desilets and P. M. Grant, "A Digital Synthetic Focus Acoustic Imaging System," *Acoustic Imaging,* volume 8, pp. 39–53, 1978.

8. B. D. Steinberg, "Digital Beamforming in Ultrasound," *IEEE Transactions on Ultrasonics, Ferro-Electrics, and Frequency Control,* volume 39, pp. 716–721, November 1992.

9. Hans Steyskal, "Digital Beamforming Antennas," *Microwave Journal,* volume 30, No. 1, pp. 107–124, January 1987.

10. R. E. Crochiere and L. R. Rabiner, "Multirate Digital Signal Processing," Chapter 2, Prentice Hall, 1983.

B. Analog and Hybrid (Analog-Digital) Beamformer Systems

Relevant analog and hybrid (analog-digital) phased array beamformer system art can be found in the following patents which are incorporated herein by reference.

| U.S. Pat. No. : | Title: | Inventor(s): |
| --- | --- | --- |
| 4,140,022 | MULTIPLE TRANSDUCER ACOUSTIC IMAGING APPARATUS | Samuel H. Maslak |
| 4,550,607 | PHASED ARRAY ACOUSTIC IMAGING SYSTEM | Samuel H. Maslak J. Nelson Wright |

-continued

| U.S. Pat. No. : | Title: | Inventor(s): |
|---|---|---|
| 4,699,009 | DYNAMICALLY FOCUSED LINEAR PHASED ARRAY ACOUSTIC IMAGING SYSTEM | Samuel H. Maslak Hugh G. Larsen |
| 5,014,710 and 5,165,413 | STEERED LINEAR COLOR DOPPLER IMAGING | Samuel H. Maslak Donald J. Burch J. Nelson Wright Hugh G. Larsen Donald R. Langdon Joel S. Chaffin Grant Flash, III |

C. Digital Beamformer Systems

The concept of a digital receive beamformer system has been proposed in the art with respect to ultrasound systems. By way of example, the following U.S. patents, all of which are incorporated herein by reference, discuss various aspects of such systems. The patents include:

| U.S. Pat. No. : | Title: | Inventor(s): |
|---|---|---|
| 4,809,184 | METHOD AND APPARATUS FOR FULLY DIGITAL BEAM FORMATION IN A PHASED ARRAY COHERENT IMAGING SYSTEM | Matthew O'Donnell Mark Magrane |
| 4,839,652 | METHOD AND APPARATUS FOR HIGH SPEED DIGITAL PHASED ARRAY COHERENT IMAGING SYSTEM | Matthew O'Donnell William E. Engeler Thomas L. Vogelsong Steven G. Karr Sharbel E. Noujaim |
| 4,886,069 | METHOD OF, AND APPARATUS FOR, OBTAINING A PLURALITY OF DIFFERENT RETURN ENERGY IMAGING BEAMS RESPONSIVE TO A SINGLE EXCITATION EVENT | Matthew O'Donnell |
| 4,893,284 | CALIBRATION OF PHASED ARRAY ULTRASOUND PROBE | Mark G. Magrane |
| 4,896,287 | CORDIC COMPLEX MULTIPLIER | Matthew O'Donnell William E. Engeler |
| 4,975,885 | DIGITAL INPUT STAGE FOR AN ULTRASOUND APPARATUS | Dietrich Hassler Erhard Schmidt Peter Wegener |
| 4,983,970 | METHOD AND APPARATUS FOR DIGITAL PHASED ARRAY IMAGING | Matthew O'Donnell William E. Engeler John J. Bloomer John T. Pedicone |
| 5,005,419 | METHOD AND APPARATUS FOR COHERENT IMAGING SYSTEM | Matthew O'Donnell Kenneth B. Welles, II Carl R. Crawford Norbert J. Plec Steven G. Karr |
| 5,111,695 | DYNAMIC PHASE FOCUS FOR COHERENT IMAGING BEAM FORMATION | William E. Engeler Matthew O'Donnell John T. Pedicone John J. Bloomer |
| 5,142,649 | ULTRASONIC IMAGING SYSTEM WITH MULTIPLE, DYNAMICALLY FOCUSED TRANSMIT BEAMS | Matthew O'Donnell |
| 5,230,340 | ULTRASOUND IMAGING SYSTEM WITH IMPROVED DYNAMIC FOCUSING | Theador L. Rhyne |
| 5,235,982 | DYNAMIC TRANSMIT FOCUSING OF A STEERED ULTRASONIC BEAM | Matthew O'Donnell |
| 5,249,578 | ULTRASOUND IMAGING SYSTEM USING FINITE IMPULSE RESPONSE DIGITAL CLUTTER FILTER WITH FORWARD AND REVERSE COEFFICIENTS | Sidney M. Karp Raymond A. Beaudin |

The basic feature of a digital receive beamformer system as disclosed above can include: (1) amplification of the ultrasound signal received at each element of an array such as, for example, a linear array; (2) direct per channel analog-to-digital conversion of the ultrasound signal with an analog-to -digital sampling rate at least twice the highest frequency in the signal; (3) a digital memory to provide delays for focusing; and (4) digital summation of the focused signals from all the channels. Other processing features of a receive beamformer system can include phase rotation of a receive signal on a channel-by-channel basis to provide fine focusing, amplitude scaling (apodization) to control the beam sidelobes, and digital filtering to control the bandwidth of the signal.

This art points out the ever present desire to achieve, in an efficient manner, a reconstructed image of high quality.

III. SUMMARY OF THE INVENTION

The present invention relates to a method and apparatus for forming single or multiple, phase-aligned coherent, steered and dynamically focused receive beams for an ultrasonic imaging system.

A. System Architecture: Independent Parallel Programmable Multi-Channel Digital Signal Processing Receivers The present method and apparatus of the invention provides for a substantially digital signal processing architecture of independent receivers, preferably assigned one to each available signal from a transducer, which are fully programmable for adjustment of signal parameters and beamformation parameters at rates consistent with dynamic focusing and with updating at every scan line. Each receiver has multiple processing channels that can support formation of multiple simultaneous beams (scan lines). The independence, programmability, and processor channelization support a versatility not available in prior art. The architecture achieves independent receivers (1) by creating a separate central control apparatus (subject of a co-pending patent application) that determines all signal and beamformation parameters independent of all receivers, and (2) by programming the parameters into each receiver at rates needed to sustain dynamic focusing and/or scan-line-to-scan-line adjustments. The digital receive beamformer architecture can therefore support conventional beamformation, and can also support enhanced receive beamformer capability, such as adaptive beamformation. Signal and beamformation parameters that can be programmed on a scan-line interval basis include: delay sample values, apodization sample values, demodulation frequency, signal-shaping filter values, gain, sample rate, gain and phase calibration adjustments, and number of simultaneous receive beams. The advantage of a system architecture with independent receivers having programmable features is the ability to support new receive beamformation techniques, which can be accomplished by reprogramming the types of parameters sent to the receivers.

B. System Architecture—Maximum Computational Capacity Utilization

The present method and apparatus of the invention provides for an architecture having a unique arrangement and implementation of digital signal processing and beamforming building blocks which provide enhanced beam reconstruction. The arrangement of the building blocks as a whole provides for a digital receive beamformer system with full and maximum signal processing computational capacity utilization. This innovative architecture allows for processing mode trade-offs among (1) receive signal nominal center frequency $F_0$, (2) receive signal spatial range resolution $\gamma_B$ (inversely related to receive signal bandwidth) and (3) the number of simultaneously received beams $N_B$, for a broad range of imaging frequencies such that the computational building blocks of the architecture are efficiently used to their maximum. Thus for example, when operating at a selected center frequency, the number of simultaneously received beams can be traded against the range resolution. The digital receive beamformer system can, therefore, operate at a full computational capacity and without having idle process time or hardware. Advantages of such flexibility include the fact that a larger number of beams affords a higher frame rate which is desirable, for example, when imaging moving objects.

Another aspect of the method and apparatus of the present invention is that the high rate computations are performed by more blocks of the architecture before any distinction is made, in a dynamic delay memory, among the beams of a multiple beam system. This reduces the number of computations required, increases system speed and versatility in accordance with the utilization of full computational capacity, and minimizes dynamic delay memory size.

C. System Architecture—Versatility

It is to be understood that the various aspects of the method and apparatus of the invention can afford significant advantages when used by themselves without dependency from other aspects of the invention, as more fully discussed in the detailed description and outlined in the claims. By way of example only, the variable time delay memory can be used in other arrangements than specified above. The variable time delay memory can be used in a system which can include a complex multiplier but where at least one of the first and second decimators would not be present. Also by way of example, the local control processor for producing delay, apodization, phase and frequency, and calibration values could be used separately or together with some or all of the control values and parameters supplied for the central beamformer control as discussed in co-pending patent application entitled: METHOD AND APPARATUS FOR FOCUS CONTROL OF TRANSMIT AND RECEIVE BEAMFORMER SYSTEMS.

Along this same concept of independent advantages, it is noted that the time delay memory can be uniquely used to separate data from a multiple-beam data stream in receive path arrangements other than that specified herein.

Accordingly, the present invention improves upon the prior art by defining a computationally efficient beamformer which allows a trade-off among (1) receive signal nominal center frequency $F_0$, (2) normalized per-beam relative spatial range resolution $\gamma_B/\lambda_O$ (inversely related to receive signal bandwidth), and (3) number of beams $N_B$.

Additionally, the digital receive beamformer comprises a means for processing a signal which is representative of one or more beams, with this processing including means for adjusting the spatial range resolution (receive signal bandwidth) depending on the number of beams represented by the signal. Further, the adjustment of the receive signal spatial range resolution is also related to the receive signal nominal center frequency for each beam.

The system also provides for efficient decimation operations. Decimation in general provides for a signal with reduced data which reduces computational needs downstream.

Additionally, the present invention provides for dynamically varying the time delay and apodization value on a sample-by-sample basis for every sample in the scan format. Thus, instead of applying a single time delay and/or apodization value, dynamically varying time delay and/or apodization values provide for a totally reconstructed new data stream. This arrangement has an additional advantage that multiple beams can be reconstructed out of the delay memory in one digital signal path.

D. Arrangements of Per Multi-Channel Processor Digital Signal Processing Components In another aspect of the invention the post ADC digital receive signal processing architecture provides for (1) a first programmable decimator, (2) a dynamic or variable time delay memory, and (3) a second programmable decimator. Such an arrangement affords the above advantage with respect to full and maximum signal processing computational capacity utilization. Thus, the relationship between (1) receive signal nominal center frequency $F_0$, (2) receive signal spatial range resolution $\gamma_B$ (inversely related to receive signal bandwidth), and (3) the number of simultaneously received beams $N_B$ can be implemented by the selection of decimation rates with respect to the decimators and in particular the second decimator, and with respect to the application of time delay values to the memory in order to distinguish among receive beams.

In still another aspect of the method and apparatus of this invention, the system can include a time delay memory followed by a decimator in order to afford the above computational efficiencies and trade-offs.

In yet another aspect of the invention signal demodulation to or near baseband (defined as at or near zero Hertz) can occur in a variety of different locations and be within the spirit and scope of the invention which affords maximum and flexible computational capacity utilization. By way of example only, demodulation could occur prior to the first decimator, after the second decimator, or elsewhere in the signal path between the first decimator and the second decimator.

In another embodiment, the demodulation can occur after the stage where all of the individual channels of the beamformer processors are summed into a representation of a receive scan line and prior to detection and video image processing. In the below present preferred embodiment, demodulation occurs both as part of the operation of the second decimator, and as part of the operation of the complex multiplier. Alternatively, demodulation could occur only as part of the operation of the second decimator or only as part of the operation of the complex multiplier.

In another aspect of the method and apparatus of the invention, the system can include a time delay memory, followed by a decimator and a complex multiplier.

Another novel aspect of the method and apparatus of the invention is the time delay memory. The time delay memory can selectively and dynamically choose from a string of data samples stored in the memory in order to track receive signals with depth along each receive beam by dynamically adjusting the time delay input to the time delay memory. Data samples from each receive analog-to-digital converter can preferably be stored in the memory in the order sampled by the analog-to-digital converter. Selection of those data samples received and stored, first-in-time, in the memory cause a greater signal delay than the selection of those data samples received and stored, later-in-time, in the memory. Time delay profiles, which profiles can as required for image reconstruction change with range, can be used to selectively and dynamically choose the desired signal time delay, and thus which signal data is addressed and read out of the time delay memory. Further, multiple time delay profiles can be used to select time delays during multiple beam operation. Thus, through the use of multiple delay profiles, the receive signal data stored in the time delay memory can be separated into multiple representations required for the formation of individual receive beams.

In another aspect of the method and apparatus of the invention, the receive signal processing architecture provides for (1) a first programmable decimator which provides filtering and decimation, (2) a variable time delay memory, (3) a second programmable decimator which provides filtering, decimation and demodulation to or near baseband (i.e. to or near zero Hertz), and (4) a complex multiplier structure which can selectively provide for signal phasing and apodization, and which can also provide residual demodulation of the signal to or near baseband. (Under certain operating conditions, the filter of the first programmable decimator, and the filter of the second programmable decimator can be selectively operated in a bypass mode.)

In yet another aspect of the method and apparatus of the invention the first and second decimator structures are programmable to selectively utilize a number of different filter characteristics including filter coefficients and decimation factors to achieve the desired results. Programmability means that the filter coefficients and decimation factors may be permanently stored in the filters and decimators, with the system selecting among such stored values, or these values can be downloaded from, for example, a central control. Thus, as used herein, a device or function which is programmable includes those which can be programmed either (1) by providing as required a set of specific values (downloaded from, for example, a central control) for use by the device or function, or (2) by selecting such values from a pre-determined set of available values which are pre-stored by the device or function. Similarly, the acts of programming carry the same meanings. Such structures can include one or more digital filters provided in various arrangements with a decimator. The second programmable decimator can also simultaneously provide for demodulation near or to baseband through the use of real-or complex-valued filter coefficients.

In still another aspect of the method and apparatus of the invention, decimator two can as suggested above determine the desired receive spatial range resolution (bandwidth mode) for the signal in a computationally efficient manner.

In yet another aspect of the method and apparatus of the invention, the second decimator provides demodulated complex I (In-phase) and Q (Quadrature) data.

Another novel aspect of the method and apparatus of the invention includes the complex multiplier which applies a focusing phase shift (derived from focusing delay), apodization, and in a preferred embodiment, demodulation. It is to be understood that the phase shift, apodization, and demodulation can be applied in one combined structure, or in separate structures located adjacent to each other or positioned advantageously in other locations of the signal path. This phase shift is in addition to the time delay which is applied to the variable time delay memory. The focusing phase shift and the apodization values are dynamically variable across the individual elements of the transducer array and also along the range direction of the receive scan. Thus, the signal received can be dynamically focused on a sample-by-sample basis for all data samples in the scan format to form the image.

E. Secondary Control of Multi-Channel Processor Digital Signal Processing for Receive Beamformation In another aspect of the invention, the method and apparatus includes a local or secondary control per receive processor which cooperates with a central or primary control. The local or secondary control dynamically provides time delay, phase rotation, apodization and calibration values to each sample of each receive beam. The local or secondary control includes a memory address and delay processor, a phase and frequency processor, an apodization processor, and a calibration processor.

In another aspect of the invention, the memory address and delay processor calculates time delay values to be applied to the delay memory, on a per beam and per sample basis.

In a further aspect, the phase and frequency processor calculates phase values which can be a summation of a demodulation phase value and a fine focusing time delay in the form of a phase rotation or shift value at the nominal center frequency, on a per-beam and per-sample basis. The phase and frequency processor can track receive signal frequency downshifting with tissue depth due to attenuation.

In a further aspect, the apodization processor calculates apodization values on a per beam and per sample basis.

In another aspect, the calibration processor calculates calibration values on a per analog receive path sample basis.

Additional advantages, objects, and novel features can be obtained from a review of the specification and the figures.

IV. BRIEF DESCRIPTION OF THE FIGURES

FIGS. 1a and 1b conceptually depict the transmission and reception of ultrasound beams to and from body tissue.

FIG. 2a depicts a high level block diagram schematic of a novel ultrasound beamformer system of an ultrasound medical imaging system including an embodiment of a digital receive beamformer system of the invention.

FIGS. 2b and 2c taken together depict a detailed block diagram of the ultrasound beamformer system of FIG. 2a.

FIG. 5c depicts a series of evolving delay profiles which have increasing aperture widths with increased range along a receive scan line centered on and normal to the transducer array.

FIGS. 6a, 6b and 6c depict graphically the storage and selection of appropriate time delayed data from the variable time delay memory of the digital multi-channel receive processor of FIG. 4.

FIG. 7 depicts schematically the selection of data stored in the variable time delay memory of FIG. 4 for purposes of outputting delay data representative of that used to form multiple beams.

FIG. 8 depicts a schematic of an embodiment of the complex multiplier, the phase and frequency processor, and the apodization processor of the local processor control of the invention.

FIGS. 10a, 10b and 10c depict graphs of typical signal frequency downshifting profiles that can be applied for signal demodulation and fine phase adjustment in the complex multiplier and for signal remodulation in the phase aligner. FIGS. 10d, 10e and 10f depict graphs of signal frequency downshifting profiles appropriate for signal demodulation.

FIG. 11 depicts a series of differently evolving apodization profiles which have increasing aperture widths with increased range along a receive scan line centered on and normal to the transducer array.

V. DETAILED DESCRIPTION OF THE PREFERRED EMBODIMENT

Figure 2A:
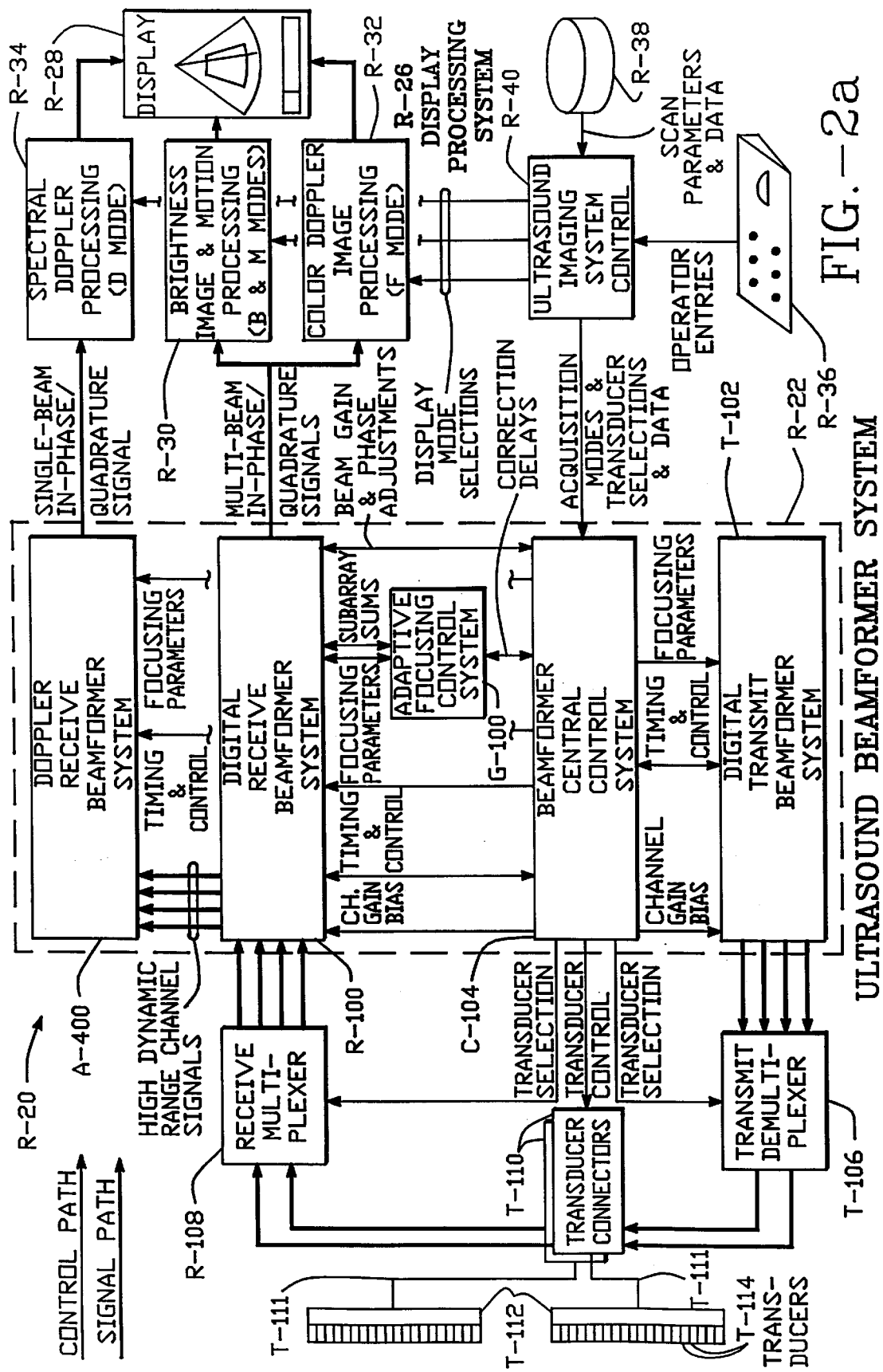

The present invention represents a component of a medical ultrasound imaging system for which additional patent applications, listed above, have been simultaneously filed in the United States Patent and Trademark Office.

A. Overview of the Preferred Beamformer System Architecture

1. Ultrasound Signal Description

With respect to the present invention, ultrasound imaging is accomplished by firing (transmitting) into body tissue or other objects to be imaged a scan sequence of focused ultrasonic beams centered along straight lines in space called transmit scan lines (FIG. 1a). The transmit scan lines are generated by a transmit beamformer and an ultrasound transducer array. The transmit scan lines are spaced to produce a planar linear, planar sector or other display of the tissue via a pre-defined firing or scanning pattern. Focused to some defined depth in the tissue, the ultrasonic transmit continuous-wave (CW) or pulse-wave (PW) signal, propagating at an assumed constant propagation velocity of nominally c=1540 m/sec through the tissue, interacts with the tissue and reflects a small portion of the signal back to the ultrasound transducer array that initiated the ultrasound signal. The round trip delay time is shortest for those targets closest to the ultrasound transducer array, and longest for those targets farthest from the transducer array. With the application of appropriate time delays, the receive beamformer (FIG. 1b) can dynamically focus receive beams along straight lines in space called receive scan lines commencing, for example, with the shallowest range (depth) of interest and evolving toward the deepest range of interest.

FIGS. 1a and 1b depict representations of transmit and receive scan lines (solid) and straight-line signal propagation paths from individual elements (dashed), respectively. In FIG. 1a, the transmit beamformer is generally identified by T-50 with the transducer array T-52 containing a multiplicity of individual transducer elements T-54 organized as a linear phased array in this particular embodiment. As is known in the art, there are a great variety of transducer array configurations available for use with ultrasound transmit and receive beamformer systems. As can be seen in FIG. 1a, the transmit beamformer T-50 sends appropriately time-delayed electrical signals to the individual transducer elements T-54. These transducer elements T-54 then in turn convert electrical signals into acoustic waves that propagate into the body tissue T-56. By applying different time delays to the excitation signals sent to the individual transducer elements T-54, transmit scan lines T-60 and T-62, having respective foci $r_1$ and $r_2$, can be established. It is to be understood that each of these transmit scan lines is representative of a center line of a different transmit beam which is steered and focused into the body to be imaged.

The transmit beamformer T-50 can generate simultaneous multiple beams along different scan lines, or different focal depths along the same scan line (compound focus). Further, the multiple transmit beams can each scan the entire image format or be transmitted such that each of the multiple beams only scans a specified section of the image format.

FIG. 1b depicts a digital receive beamformer R-58 which is also connected to the transducer array T-52. Also depicted in FIG. 1b are receive scan lines R-64, R-66 corresponding to a dynamically focused first receive beam and a dynamically focused second receive beam, respectively. The beams are sampled in range at a plurality of focal depths ($r_1, r_2, r_3$) along each scan line. In the digital receive signal path of the present invention, transducer array signals can be selectively separated into data representative of multiple individual beams.

Each scan line of a transmit or receive scan pattern can be parameterized by the origin on the transducer array, the scan line orientation (angle θ) and the focus depth or range (r). The ultrasound imaging system of the present invention stores a pre-computed sparse data set of focusing time delay and aperture apodization values indexed by these parameters (based on geometric considerations as is known in the art) and expands the values by real-time computational means to control the transmit and receive beamformation systems that produce the desired scan lines.

2. Beamformer System

FIGS. 2a, 2b, 2c depict an overall block diagram of a medical ultrasound imaging system R-20. Ultrasound system R-20 includes a beamformer system R-22, one or more transducers T-112, a display processing system R-26 with a display R-28 and an ultrasound imaging system control R-40.

In FIGS. 2a, 2b, or 2c, the beamformer system R-22 includes inventive and novel (1) digital transmit beamformer system T-102, (2) digital receive beamformer system R-100, (3) beamformer central control system C-104, (4) adaptive focusing control system G-100, (5) Doppler receive beamformer system A-400, (6) baseband multi-beam processor R-125, and (7) coherent sample synthesizer S-100. These systems are depicted as high level, functional block diagrams. The blocks are abstracted from the actual implementation of a preferred embodiment in order to better illustrate the signal processing functions performed.

As indicated in FIG. 2a, beamformer system R-22 provides two sources of digital beam data to the display processing system R-26: (1) Doppler receive beamformer single-beam complex in-phase/quadrature data representing coherent temporal sampling of the beam (CW case) or coherent temporal sampling at one range location along the beam (PW case), and (2) digital receive beamformer multi-beam complex in-phase/quadrature data representing coherent sampling in range along each receive scan line. Beamformer system R-22 can be operated to provide a sequence of scan lines and associated samples as above to provide data for a variety of display modes. By way of example, possible display modes and their associated processors include (1) brightness image and motion processor R-30 for B-mode (gray-scale imaging) and M-mode (motion display), (2) color Doppler image processor R-32 for flow imaging, and (3) spectral Doppler processor R-34 for wide dynamic nonimaging Doppler velocity vs. time displays. Additional display modes can be created from the two complex data sources of R-22, as will be obvious to those skilled in the art.

Ultrasound system R-20 also includes a transmit demultiplexer T-106 for routing the output waveforms from the transmitters T-103 to the transducer elements T-114, a receive multiplexer R-108 for routing the input waveforms from the transducer elements T-114 to the receivers R-101, one or more transducer connectors T-110 and transducer arrays T-112. Many types of transducer arrays can be used with the present system.

Ultrasound system R-20 also includes an ultrasound imaging system control R-40, archival memory R-38 for storing scan parameters and scan data, and operator interface R-36.

As used herein, the term ultrasonic refers to frequencies above the range of human hearing. However, the transducer arrays T-112 are optimized for frequencies typically within the range of 2–10 MHz.

The transducer array T-112 is interchangeable with a variety of different kinds of transducer arrays, including but not limited to linear, curved, curvi-linear and annular transducer arrays. A variety of transducer array shapes and frequencies are desirable in order to satisfy the requirements of a variety of different clinical settings. However, the transducer arrays T-112 are typically optimized for frequencies within the above specified range of 2–10 MHz. The medical ultrasound system R-20 performs the three major functions of driving the ultrasonic transducer array of elements T-114 to transmit focused ultrasound energy, receiving and focusing back-scattered ultrasound energy impinging on the transducer array T-114, and controlling the transmit and receive functions to scan a field of view in scan formats including (but not limited to) linear, sector or Vector® format.

In FIGS. 2a, 2b, 2c, the control signals are communicated over the light lead lines while the signal paths are depicted with heavy lead lines.

3. Digital Transmit Beamformer System

The digital transmit beamformer T-102 (FIG. 2c) is the subject of the above cited co-pending application entitled: METHOD AND APPARATUS FOR TRANSMIT BEAMFORMER SYSTEM. It is to be understood that in a preferred embodiment, the digital transmit beamformer T-102 is comprised of a plurality of digital multi-channel transmitters T-103, one digital multi-channel transmitters for one or more of the individual transducer elements T-114. The transmitters are multi-channel in that each transmitter can process, in a preferred embodiment, up to four independent beams. Thus, for example, 128 multi-channel transmitters have 512 channels. In other preferred embodiments, more than four independent beams can be achieved. Processing more than four beams per processor is within the scope of the invention.

In a preferred embodiment, each of the digital multi-channel transmitters T-103 produces as its output in response to an excitation event the superposition of up to four pulses, each pulse corresponding to a beam. Each pulse has a precisely programmed waveform, whose amplitude is apodized appropriately relative to the other transmitters and/or channels, and delayed by a precisely defined time delay relative to a common start-of-transmit (SOT) signal. Transmitters T-103 are also capable of producing CW.

Each digital multi-channel transmitter T-103 conceptually comprises a multiple beam transmit filter T-115 which provides an output to a complex modulator T-117. The output from complex modulator T-117 is communicated to a delay/filter block T-119, and therefrom is provided to a digital-to-analog converter (DAC) T-121. The output of the DAC T-121 is amplified by an amplifier T-123. The multiple beam transmit filter T-115, the complex modulator T-117 and the delay/filter block T-119 comprise a digital multi-channel transmit processor T-104.

The transmit filter T-115 can be programmed to provide any arbitrary real or complex waveform responsive to a start-of-transmit (SOT) signal. The transmit filter T-115 is implemented with a memory which stores real or complex samples of any desired and arbitrary pulse waveform, and a means of reading the samples out sequentially in response to the start-of-transmit (SOT) signal delayed by a component of the focusing delay. In a preferred embodiment, the memory of T-115 is programmed to store baseband representations of real or complex pulse envelopes.

Block T-115, although primarily a memory, is referred to herein as a transmit filter, as the output of block T-115 can be thought of as the time response of a filter to an impulse. The complex modulator T-117 upconverts the envelope to the transmit frequency and provides appropriate focusing phase and aperture apodization.

Delay/filter block T-119 conceptually provides any remaining focusing delay component and a final shaping filter. The digital-to-analog converter (DAC) T-121 converts the transmit waveform samples to an analog signal. The transmit amplifier T-123 sets the transmit power level and generates the high-voltage signal which is routed by the transmit demultiplexer T-106 to a selected transducer element T-114.

Associated with each multi-channel transmit processor T-104 is a local or secondary processor control C-125 which provides control values and parameters, such as apodization and delay values, to the functional blocks of multi-channel transmit processor T-104. Each local or secondary channel control C-125 is in turn controlled by the central or primary control system C-104.

4. Digital Receive Beamformer System

The digital receive beamformer R-100 (FIG. 2b) is the subject of the this application.

The signals from the individual transducer elements T-114 represent return echoes or return signals which are reflected from the object being imaged. These signals are communicated through the transducer connectors T-110 to the receive multiplexer R-108. Through multiplexer R-108, each transducer element T-114 is connected separately to one of the plurality of digital multi-channel receivers R-101 which taken together with summer R-126 comprise the digital receive beamformer R-100 of the invention. The receivers are multi-channel in that each receiver can process, in a preferred embodiment, up to four independent beams. Processing more than four beams per processor is within the scope of the invention.

Each digital multi-channel receiver R-101 can, in a preferred embodiment, comprise the following elements which are represented by the high level function block diagram in FIG. 2b. These elements include a dynamic low-noise and variable time-gain amplifier R-116, an analog-to-digital converter (ADC) R-118, and a digital multi-channel receive processor R-120. The digital multi-channel receive processor R-120 conceptually includes a filter/delay unit R-122 and a complex demodulator R-124. The filter/delay unit R-122 provides for filtering and coarse focusing time delay. The complex demodulator R-124 provides for fine focusing delay in the form of a phase rotation and apodization (scaling or weighting), as well as signal demodulation to or near baseband. The digital multi-channel receivers R-101 communicate with summer R-126 where the signal samples associated with each beam from each receive processor are summed to form final receive scan line samples, and the resulting complex samples provided to baseband processor R-125. The exact functioning and composition of each of these blocks will be more fully described hereinbelow with respect to the remaining figures.

A local or secondary control C-210 is associated with each digital multi-channel receiver R-101. Local processor control C-210 is controlled by central or primary control C-104 and provides timing, control and parameter values to each said receiver R-101. The parameter values include focusing time delay profiles and apodization profiles.

5. Doppler Receive Beamformer System

The Doppler receive beamformer system A-400 for wide dynamic range, nonimaging Doppler acquisition includes analog receivers A-402, each of which receives echo signals from a respective one or more transducers T-114. Each of the Doppler receivers A-402 includes a demodulator/range gate A-404 which demodulates the received signal and gates it (PW mode only) to select the echo from a narrow range. The analog outputs of the Doppler receivers A-402 are communicated to a Doppler preprocessor A-406. In preprocessor A-406, the analog signals are summed by summer A-408 and then integrated, filtered, and sampled by analog processor A-410. Preprocessor A-406 then digitizes the sampled analog signal in an analog-to-digital converter (ADC) A-412. The digitized signal is communicated to the display processing system R-26. The Doppler receive beamformer system is the subject of the above identified co-pending patent application entitled: METHOD AND APPARATUS FOR DOPPLER RECEIVE BEAMFORMER SYSTEM which has been incorporated herein by reference.

Associated with all Doppler receivers A-402 is a single local or secondary Doppler beamformer control C-127. Doppler beamformer control C-127 is controlled by central or primary control system C-104 and provides control and focusing parameter values to the Doppler receive beamformer system A-400.

As pointed out in the above patent application describing the Doppler receive beamformer system A-400, the present beamformer system R-22 advantageously combines an imaging digital receive beamformation system R-100 and a nonimaging Doppler receive beamformation system A-400 in a manner which uses the same digital transmit beamformation system T-102 and the same transducer array and allows the digital receive beamformation system R-100 to be optimized for imaging modes such as B-mode and color Doppler imaging, and therefore has high spatial resolution, while the accompanying Doppler receive beamformation system has a wide dynamic range and is optimized for use in acquiring signals for nonimaging Doppler processing.

6. Beamformer Central Control System

The beamformer central control system C-104 of the present invention controls the operation of the digital transmit beamformer system T-102, the digital receive beamformer system R-100, the Doppler receive beamformer system A-400, the adaptive focusing control system G-100, and the baseband processor R-127. The beamformer control is more fully discussed in the above referenced and incorporated patent application entitled: METHOD AND APPARATUS FOR FOCUS CONTROL OF TRANSMIT AND RECEIVE BEAMFORMER SYSTEMS.

The main control functions of the central control system C-104 are depicted in FIG. 2c. The control functions are implemented with four components. The acquisition control C-130 communicates with the rest of the system including the ultrasound system control R-40 and provides high level control and downloading of scanning parameters. The focusing control C-132 computes in real time the dynamic delay and apodization digital values required for transmit and receive beamformation, which includes pre-computed and expanded ideal values plus any estimated correction values provided by adaptive focusing control system G-100. The front end control C-134 sets the switches for the demultiplexer T-106 and the multiplexer R-108, interfaces with the transducer connectors T-110, and sets the gain and bias levels of all transmitter amplifiers T-123 and all receive amplifiers R-116. The timing control C-136 provides all the digital clocks required by the digital circuits. This includes the sampling clocks for all the transmitter DACs T-121 and receiver ADCs R-118.

In a preferred embodiment central control C-104 expands sparse tables of focusing time delay and aperture apodization values based on pre-computed and stored data, through such techniques as interpolation and extrapolation. The expanded delay and apodization values are communicated as a profile of values across the transducer aperture to the local processor controls, where the delay and apodization data expansion in range is completed to per-transducer-element, per-sample, per-beam values.

7. Adaptive Focusing Control System

Adaptive focusing control system G-100 provides for real time concurrent adaptive focusing. Adaptive focusing control system G-100 is comprised of an adaptive focus processor G-505 which provides focus correction delay values to the focus control C-132 of the central control C-104. Adaptive focus processor G-505 operates on output produced by aberration value estimators G-502 from data gathered from the subarray summers R-126 of the digital receive beamformer system R-100. Accordingly, aberration correction values, preferably aberration delay and amplitude values, are adaptively measured for each receive scan line or for a subset of receive scan lines in range regions corresponding to transmit focal depths by the adaptive focusing control subsystem G-100 shown in FIG. 2c. Adaptive focusing control system G-100 is more fully described in the above identified co-pending patent application entitled:

METHOD AND APPARATUS FOR REAL TIME, CONCURRENT ADAPTIVE FOCUSING IN AN ULTRASOUND BEAMFORMER IMAGING SYSTEM.

It is to be understood that in addition to the adaptive focusing control system which adjusts focus delays, that a number of adaptive control systems are contemplated. These systems, by way of example, include (1) adaptive contrast enhancement control system for adjusting focus delays and aperture apodizations, (2) adaptive interference cancellation control for adjusting focus delays and phases, aperture apodizations, and (3) adaptive target enhancement control for adjusting focus delays and phase, aperture apodizations, imaging transmit and receive frequencies and baseband waveform shaping.

Another aspect of adaptive focusing which can be included in the preferred embodiment of the adaptive focusing control system G-100 is a geometric aberration transform device G-508/509 which can provide aberration correction delay values to the adaptive focus processor G-505 for scan lines and scan line depth locations for which measured aberration values were not collected by aberration value estimators G-502. More specifically, measured aberration correction values are written to a delay table in G-508/509. G-508/509 retrieves values from the delay table according to look-up rules of the geometric aberration transform to form focusing delay correction profiles across the aperture valid for depths, scan geometries, and acquisition modes other than the depth, scan geometry, and mode for which aberration correction values were measured. The geometric aberration transform device G-508/509 is the subject of the above identified co-pending U.S. patent application entitled: METHOD AND APPARATUS FOR A GEOMETRIC ABERRATION TRANSFORM IN AN ADAPTIVE FOCUSING ULTRASOUND BEAMFORMER SYSTEM.

8. Baseband Processor System The baseband processor R-125 provides for filtering, and receive-scan-line-to-receive-scan-line (beam-to-beam) amplitude and phase adjustments as discussed herein and in the above-referenced and incorporated patent applications entitled: METHOD AND APPARATUS FOR A BASEBAND PROCESSOR FOR A RECEIVE BEAMFORMER SYSTEM and METHOD AND APPARATUS FOR ADJUSTABLE FREQUENCY SCANNING IN ULTRASOUND IMAGING, and the above-referenced patent application entitled METHOD AND APPARATUS FOR COHERENT IMAGE FORMATION.

The baseband processor R-125 additionally includes a baseband filter, a complex multiplier, and a baseband processor control which controls the operation of the baseband filter and complex multiplier. The baseband processor control is controlled by central control C-104.

9. Coherent Sample Synthesizer System

The coherent sample synthesizer system S-100 (FIG. 2a) is the subject of the above-identified application entitled: METHOD AND APPARATUS FOR COHERENT IMAGE FORMATION.

This system exploits the multi-beam transmit and multi-beam receive capability of the invention to acquire and store coherent (pre-detection) samples of receive beam data along actual scan lines and to perform interpolation of the stored coherent samples to synthesize new coherent samples at new range locations along existing scan lines or along synthetically-created scan lines. Both acquired and synthesized samples are passed to the display processing system R-26.

10. Transmit and Receive Multiplexers

The connectivity between the transducer array elements T-114 and the processors T-103, R-101, A-402 of the digital transmit, digital receive, and Doppler receive beamformer systems is established through a transmit demultiplexer T-106 and a separate receive multiplexer R-108, as shown in FIG. 2a. The multiple-transducer multiplexer configuration shown in FIG. 2a permits selection of transmit and receive apertures lying entirely within a single transducer array or straddling across two transducer arrays. The two multiplexers are independently controlled by the beamformer central control system C-104 and may be programmed to support a number of acquisition modes, including sliding aperture and synthetic aperture modes. The multiplexers and their connectivity are the subject of the above-cited copending application entitled: METHOD AND APPARATUS FOR BEAMFORMER SYSTEM WITH VARIABLE APERTURE.

B. Digital Receive Beamformer System Preferred Embodiment

1. Analog Front End a. Low Noise, Variable Time-Gain Amplifier

As is known in the art, a time-varying gain is applied to the receive signal to compensate for attenuation with depth. In this embodiment, the gain is applied by an analog low noise, time-gain amplifier R-116 (FIG. 2b). There is one low noise, time-gain amplifier R-116 for each digital multi-channel receiver R-101. A common gain function is applied to all amplifiers R-116, although independent gains could be applied to each amplifier R-116. The gain varies with the range (or time, as range and time are related to each other in accordance with the speed of sound in the medium being imaged) from the object being imaged to the transducer elements.

b. Analog-To-Digital Converter (ADC)

The analog-to-digital converter (ADC) R-118 (FIG. 2b) in the preferred embodiment oversamples the signal by at least four times (preferably four, eight, sixteen or thirty-two times) the receive signal nominal center frequency $F_o$. It is to be understood that the oversample rate can be lower or greater than four times and remain within the spirit and scope of the invention. Thus, if the system is imaging at 10 MHz, the ADC R-116 is sampling at a rate of 40 MHz. Preferably the ADC R-116 is an eight or more bit ADC. However, it is to be understood that as is evident from the patents listed before, many types of ADCs can be used with the beamformer and be within the scope of the invention.

2. Multi-Channel Digital Signal Processing (Digital Multi-Channel Receive Processor R-120)

a. Processing Modes

Figure 3:
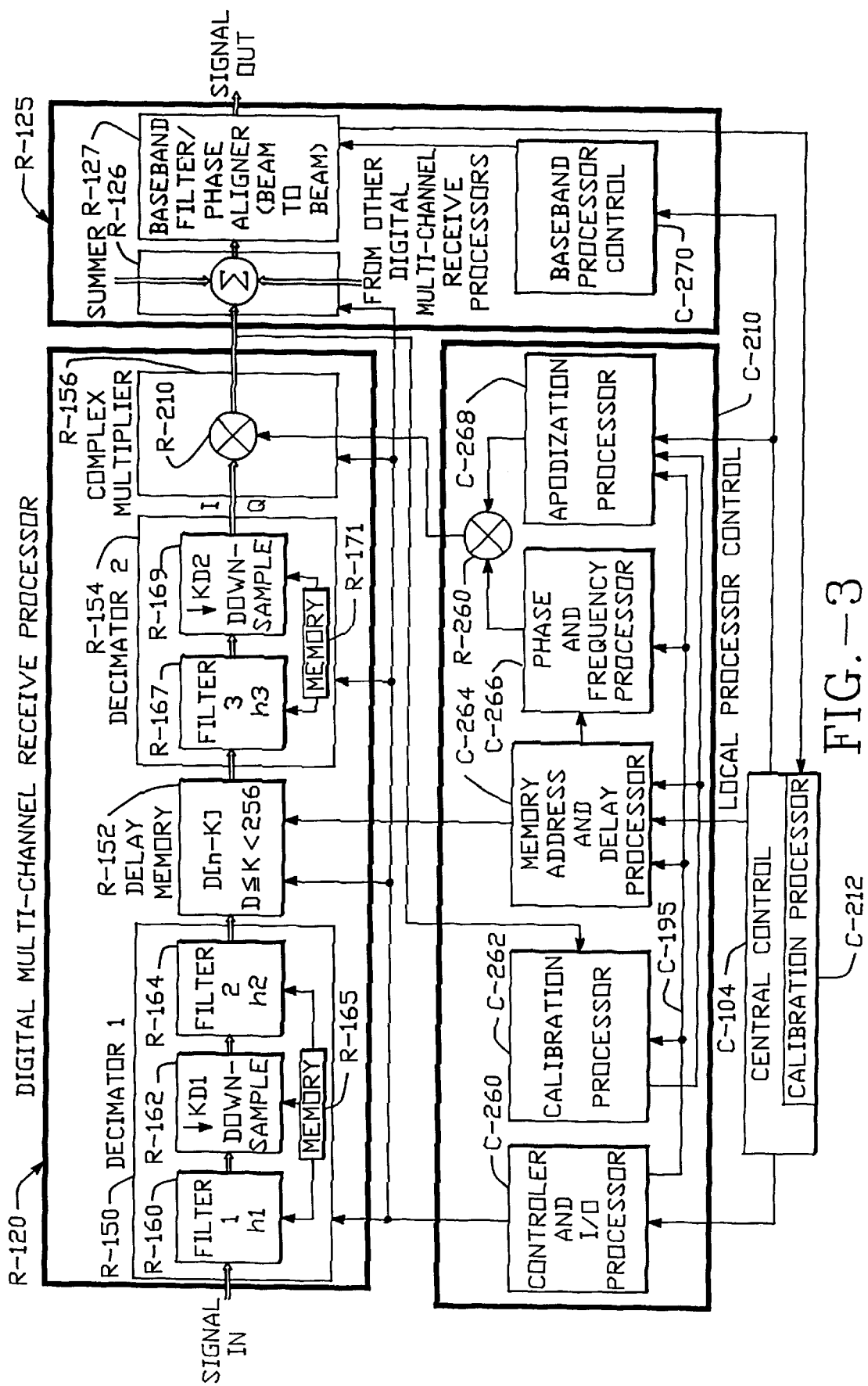
FIG. 3 depicts a detailed block diagram of an embodiment of a digital multi-channel receive processor and baseband multi-beam processor of the invention of FIG. 2.

Before describing the functional blocks in FIG. 3, it will be useful to understand the various processing modes in which each receive processor can operate. Ideally, it would be desirable for each receive processor to be able to process any number of superposed and separately delayed and apodized receive beams up to some maximum, at any receive signal nominal center frequency $F_0$ up to some maximum, specified by a receive signal spatial range resolution $\gamma_B$ (inversely related to receive signal bandwidth) up to some maximum. This would require extensive processing power, however, especially if the maximums are large. Since processing power is limited in any system, it would seem that these maximums must be kept low enough such that the hardware is able to keep up when all three parameters are specified at maximum. The present embodiment, on the other hand, makes better use of the available processing power by permitting trade-offs among these three parameters and allowing the central control system to choose among processing modes depending on the clinical setting. It is to be understood that once the user selects a transducer, a mode and scan format pursuant to the clinical setting, that preferably the method and apparatus automatically selects from the preselected and pre-stored processing modes.

Table I sets forth some of the processing modes which can be selected by central control system C-104 to be applied to all digital multi-channel receive processors R-120 of receive beamformer R-100. Different embodiments can support fewer or greater numbers of modes and fewer or greater numbers of beams. As used in the Table:

$F_s$: is the system clock frequency. The central control C-104 can set $F_s$ at any of a variety of frequencies.

$F_{ADC}$: is the ADC sampling frequency or the rate at which samples are converted by the ADC R-118 (FIG. 2b), where typically $F_{ADC}=F_s$ or $F_s/2$.

$F_0$: is a receive signal nominal center frequency. $F_0$ is equal to, or near, the actual signal carrier frequency $F_c$ and is therefore considered to be the nominal receive signal frequency. $F_0$ is specified for each digital multi-channel receiver R-101 as a fraction of $F_s$. $F_0$ is programmable by the central control C-104 for each digital multi-channel receiver R-101 based on prestored values.

c: is the speed of sound in the body.

$\lambda_0$: is the acoustic wavelength of $F_0$; $\lambda_o=c/F_0$.

$F_c$: is the receive signal carrier frequency (an imaging frequency). The digital multi-channel receiver R-101 can be tuned by verniering. $F_0$ to $F_c$. $F_c$ and $F_o$ are related in the invention by a frequency scaling factor or frequency vernier factor v, such that $v \cdot F_o = F_c$ as pre-stored in the central control. The range of the carrier frequencies $F_c$ for which the invention can be tuned ranges theoretically between $0 \times F_o$ to $2 \times F_o$, but typically is 75% of $F_o$ to 125% of $F_o$.

$R_o$: is the per-beam complex (I/Q-pair) output sampling rate or per beam processing rate. The ratio $R_0/F_0$ represents the number of complex samples per period of the receive signal nominal center frequency $F_0$.

$\gamma_B$: is the per-beam spatial range resolution. Note that $\gamma_B=c/2R_o=\lambda_0/(2R_o/F_0)$ Spatial Range Resolution (or bandwidth modes (BW Mode)) selected at Decimator Two: There are 6 spatial range resolutions (or bandwidth modes) in the preferred embodiment, accounting for spatial range resolution between values $F_0/2$ to $4F_0$. Values outside these values are within the spirit and scope of the invention.

Spatial range resolution (Bandwidth Modes)

BW MODE 1: $R_0=4F_0$ or $\gamma_B=\lambda_0/8$.
BW MODE 2: $R_0=2F_0$ or $\gamma_B=\lambda_0/4$.
BW MODE 3: $R_0=F_0$ or $\gamma_B=\lambda_0/2$.
BW MODE 4: $R_0=F_0/2$ or $\gamma_B=\lambda_0$.
BW MODE 5: $R_0=2F_0/3$ or $3\gamma_B=\lambda_0/4$.
BW MODE 6: $R_0=F_0/3$ or $3\gamma_B=\lambda_0/2$.

$N_B$=maximum number of simultaneously produced beams for the given processing mode. (Note that the beamformer can be operated to produce fewer than $N_B$ beams if desired; for example, in a mode for which $N_B$=4, the beamformer can be operated to produce only three beams if desired, although this would not make full use of the available hardware processing power.)

N/I=Mode not implemented in preferred embodiment.

TABLE 1

| | RECEIVE PROCESSING MODES (Output of Decimator Two) | | |
|---|---|---|---|
| $F_0$ (MHz) | $N_B = 1$ | $N_B = 2$ | $N_B = 4$ |
| $F_s/32$ | N/I | BW Mode 1 $R_o = 4F_0$ $\gamma_B = \lambda_0/8$ | BW Mode 2 $R_o = 2F_0$ $\gamma_B = \gamma_0/4$ |
| $F_s/16$ | BW Mode 1 $R_o = 4F_0$ $\gamma_B = \lambda_0/8$ | BW Mode 2 $R_o = 2F_0$ $\gamma_B = \lambda_0/4$ | BW Mode 3 $R_o = F_0$ $\gamma_B = \lambda_0/2$ |
| $F_s/8$ | BW Mode 2 $R_o = 2F_0$ $\gamma_B = \lambda_0/4$ | BW Mode 3 $R_o = F_0$ $\gamma_B = \lambda_0/2$ | BW Mode 4 $R_o = F_0/2$ $\gamma_B = \lambda_0$ |
| $F_s/4$ | BW Mode 3 $R_o = F_0$ $\gamma_B = \lambda_0/2$ | BW Mode 4 $R_o = F_0/2$ $\gamma_B = \lambda_0$ | N/I |
| $3F_s/8$ | BW Mode 5 $R_o = 2F_0/3$ $\gamma_B = 3\lambda_0/4$ | BW Mode 6 $R_o = F_0/3$ $\gamma_B = 3\lambda_0/2$ | N/I |

As can be seen by reading horizontally across Table 1, for each receive signal nominal center frequency $F_0$, the hardware permits a larger number $N_B$ of superposed beam waveforms to be traded-off against some degradation of the per-beam spatial range resolution $\gamma_B$, and vice-versa. A larger $N_B$ translates into a higher frame rate (since the entire field of view can be scanned with only half or one quarter the number of firings), while an enhanced spatial range resolution $\gamma_B$ (smaller value of $\gamma_B$) translates into a sharper image in range. For example, therefore, in a display mode which displays a color flow Doppler image superimposed on a grey-scale image, produced by interleaving B-mode and F-mode pulse firings, the central control C-104 could reprogram the receive beamformer R-100 to operate at $N_B$=1 for all B-mode imaging pulses and at $N_B$=2 or even $N_B$=4 for color flow Doppler imaging pulses, assuming both modes share the same $F_0$.

Similarly, reading vertically down Table 1, and excluding modes 5 and 6 for this example, it can be seen that for a given maximum number of beams $N_B$, processing modes having a higher carrier frequency (approximately $F_0$), have a larger relative per-beam spatial range resolution $\gamma_B$. A clinician typically selects a transducer operable at the carrier frequency appropriate for a desired depth penetration. In doing so, the clinician trades off penetration for overall image resolution (ability to distinguish two targets). (The latter trade-off is inherent in the physics of ultrasound since greater penetration is achieved by reducing the imaging frequency, which in turn reduces the overall image resolution.) For a given maximum number of beams $N_B$, the desired tissue penetration determines $F_0$ (Table 1), which in turn determines a processing mode having the optimum per-beam spatial range resolution which the hardware can provide at the selected $F_0$. That is, as $F_0$ decreases relative to $F_s$ to achieve greater penetration, the signal processing path in each receive channel R-101 need not process as many samples per second. This leaves hardware processing capacity available, which the system takes advantage of by increasing $R_0/F_0$ and hence improving the normalized per-beam relative spatial range resolution $\gamma_B/\lambda_0$.

Further, by reading diagonally across Table 1 (upward to the right), and again excluding modes 5 and 6 for this example, it can be seen that the hardware permits a lower $F_0$ to be traded off for a larger number of beams $N_B$ at a constant receive spatial resolution $\gamma_B$.

In summary the modes with which the receive channel R-101 can be specified to operate offer trade-offs among three parameters: $N_B$, $F_0$, and $\gamma_B$. Thus each processing mode defines a parameter set $\{N_B, F_0, \gamma_B\}$. In general, all of the processing modes shown in Table 1 satisfy the rule that for a given $F_s$, the product of the maximum number of beams $N_B$ and the channel processing rate $F_0$, divided by the normalized per-beam spatial range resolution $\gamma_B/\lambda_0$, is constant. Further, the preferred embodiment also supports additional processing modes not shown in Table 1, and which do not fully utilize the total processing capability of the system.

b. Decimator One

As can be seen in FIG. 3, the beamformer processor R-120 is comprised of decimator one R-150, time delay memory R-152, decimator two R-154 and complex multiplier R-156. Decimator one R-150 is programmable (as previously defined) and is also referred to as a variable rate decimator filter or a multi-rate decimator filter with a variety of programmable decimation factors and associated programmable filter coefficients. Decimator one R-150, in a preferred embodiment, is functionally comprised of a first filter (filter one) R-160 which has first programmable filter coefficients hi, a decimator R-162 which down-samples at a decimation factor of $K_{D1}$ (Table 2), and a second filter (filter two) R-164 which has second programmable filter coefficients of h2. In a preferred embodiment filter one (h1) is a FIR (finite impulse response), anti-aliasing low/high-pass filter. Filter one (h1) filters out the ADC quantization noise and odd harmonics of the receive signal nominal center frequency $F_0$. Preferably, filter two (h2) is a FIR, anti-alias, band-pass filter which filters out the even harmonics of the receive signal nominal center frequency $F_0$. The filter profiles and decimation rate values are programmable depending upon the receive signal nominal center frequency $F_0$ and the ADC sampling rate (FADC) Such filters can perform the additional programmable task of signal shaping.

In implementation, the functional features of the filter one (h1) R-160 and the decimator R-162 are accomplished simultaneously. It is to be understood, however, that the filtering and decimating operations can occur separately and in a less computationally efficient order in other embodiments and be within the spirit and scope of the invention.

Further it is to be understood that the present invention can be implemented with filters with a variety of lengths and using fixed or floating point operations.

A digital signal processing decimator performs both filtering and downsampling, as described in Sections 2.3.2 and 2.4 of the test by Crochiere and Rabiner, *Multirate Digital Signal Processing*, Prentice Hall 1983. Decimator filter design is disclosed in Crochiere and Rabiner and in *Digital Signal Processing Applications Using the ADSP-2100 Family*, volume 1, edited by Amy Mar of Analog Devices, DSP division, Prentice Hall 1992, which are hereby incorporated by reference.

In accordance with the same definition of programmable, the programming of filters and filter coefficients and decimation rates is accomplished by the central control C-104 which coordinates the operation of the digital multi-channel transmitter T-103 and the digital multi-channel receivers R-101. Such filter coefficients and filter values and decimation factor values can be downloaded to memory R-165 of decimator one R-150 from the central or primary control C-104. Accordingly, primary control C-104 can program memory R-165 and can select from the values programmed into memory R-165 in order to operate decimator one R-150. Alternatively such values can be permanently pre-stored in a memory such as memory R-165, with the primary control C-104 selecting among the pre-stored values depending upon the processing mode in accordance with the above definition of programmable. Further, decimation factors other than those specified in Table 2 can be selected and allow decimator one to operate within the spirit and scope of the invention.

According to the Nyquist sampling rule, a real signal must be sampled by at least a factor of two over the highest frequency of the signal in order to be able to reconstruct the signal successfully. For the signals which are received by the digital multi-channel receive processor R-120, there is a significant frequency content above the signal nominal center frequency $F_0$, and at an oversample rate of four times $F_o$ (See Table 2), these frequencies are adequately sampled. In a preferred embodiment if the data from the ADC R-118 is already at four times $F_o$, no decimation is performed. Thus, one of the normal decimation modes of decimator one R-150 is that decimator one R-150 does not decimate at all. With a beam having a signal center frequency $F_0=F_0$ of 10 MHz, and with a sampling frequency $F_s$ of 40 MHz, then the output of decimator one R-150 without decimation would be 40MHz, or four times oversampled. Data from the ADC R-118, which is sampled at greater than four times the receive signal nominal center frequency $F_0$, is downsampled to four times the receive signal nominal center frequency $4F_0$, as is evident from Table 2. The decimation factors $K_{D1}$ are selected to accomplish this rate of decimation as a function of the ADC sampling rate $F_{ADC}$.

Accordingly, in this embodiment, the relationship between the decimation factor $K_{D1}$ for decimator one and the channel processing rate or center frequency $F_0$ and the ADC sampling rate $F_{ADC}$ is $K_{D1}=F_{ADC}/4F_0$ where $F_{ADC}=F_s$ or $F_s/2$.

It is to be understood that oversampling by less than or greater than a factor of 4 (and thus with different integer and/or rational decimation factors $K_{D1}$) can be accomplished by this present invention and be within the scope of this invention.

Further, for the filter one (h1) R-160 and the filter two (h2) R-162 the filter coefficients can be selected in order to cause these filters to operate in a bypass mode (i.e., without filtering) for each of the specified decimation factors. Such bypass operation may be utilized for diagnostic purposes. Additionally for maximum wide-band processing, filter one can perform no filtering.

TABLE 2

| DECIMATION FACTORS FOR DECIMATOR ONE | | |
|---|---|---|
| $F_0$ | $K_{D1}$ Decimation Factor | Decimator One Output Rate |
| $F_s/32$ | 8 | $4F_0$ |
| $F_s/16$ | 4 | $4F_0$ |
| $F_s/8$ | 2 | $4F_0$ |
| $F_s/4$ | 1 | $4F_0$ |
| $3F_s/8$ | 2 | $4F_0/3$ |

C. Time Delay Memory

Figure 5A:
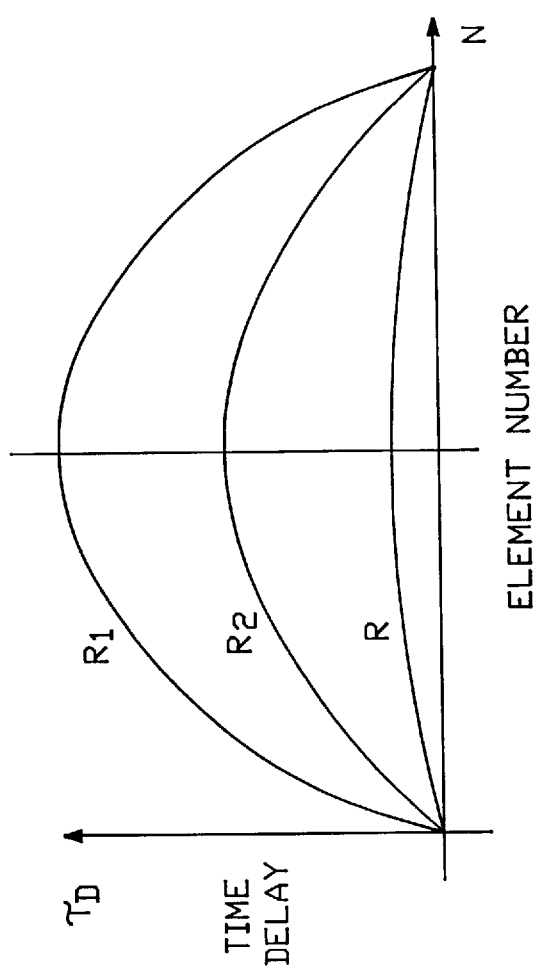
FIGS. 5a and 5b depict graphs of typical time delay profiles which can be applied to the variable time delay memory of FIG. 4.

As can be seen in FIG. 5a, the time delay profile across the aperture of a transducer is a function of both the transducer element position and the range of the object to be imaged from the transducer array. Generally, for the case where the scan line is steered straight ahead, more delay is applied in the center of the aperture (FIG. 5a) than is applied to the signals at the edges of the transducer array. This is due to the fact that it takes longer for the receive (return echo) ultrasound signals from the object to be imaged to reach the outer transducer elements than to reach the more central transducer elements or elements closer to the object to be imaged.

Also as shown in FIG. 5a for the case where the scan line is steered normal to the transducer array face, the reason that the time delay profiles are flatter as a function of range (or time to the object to be imaged) is that as the range increases to infinity, the distances from any particular transducer element to the object to be imaged converge to equal values reducing the need for time delays in order to properly sum the receive signals.

In a preferred embodiment, different time delay profiles are assigned to reference range boundaries of range zones (FIGS. 5a and 5c and as explained below). The spacing between the reference range boundaries may be equal and/or unequal as desired. Further, it is to be understood that these time delays represent a coarse time delay applied to the signal as explained below, with a fine focusing time delay implemented as a phase shift applied by the complex multiplier R-156 (FIG. 3).

Figure 5B:
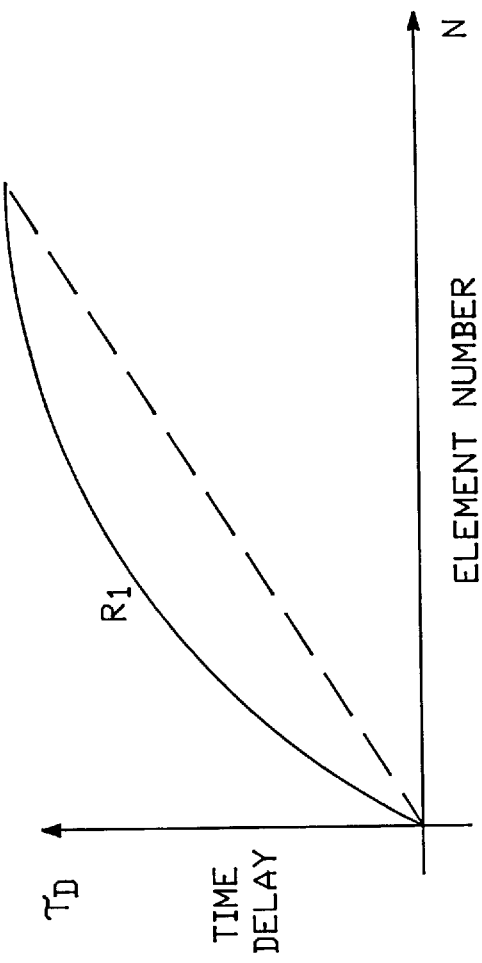

Tracking receive beams that are steered relative to the transducer aperture is a matter of changing the time delay profile with respect to the number of the transducer element and the range, as can be seen in FIG. 5b. Thus, by changing the time delay profile which is applied to select time-indexed receive data from memory, the desired beams can be steered and focused.

Figure 4:
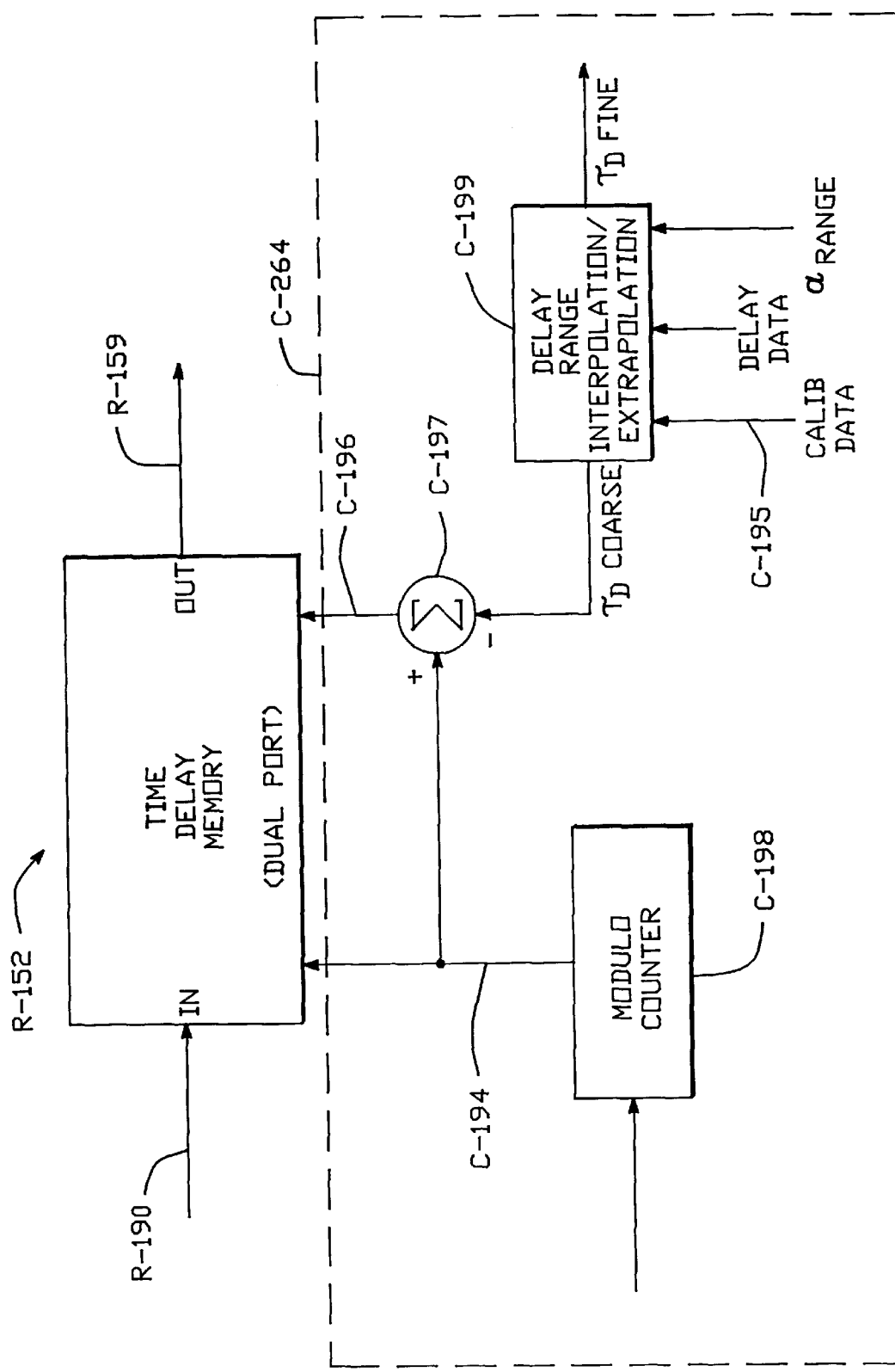
FIG. 4 depicts a schematical representation of the variable time delay memory of the digital multi-channel receive processor of FIG. 3 of the invention, along with an embodiment of the memory address and delay processor.

FIG. 4 depicts a schematic of the programmable, variable time-delay, two-port memory R-152 of the preferred embodiment. Data is read out of the memory R-152 based on continuously updated addresses derived from variable time delay profiles (such as for example described above), supplied by the central control system C-104 and the local control processor system C-210, in order to provide dynamic focusing.

Shown in FIG. 4 are data-in line R-190 and data-out line R-159 as well as in-address line C-194 and out-address line R-196. The in-address line C-194 is updated at a constant rate with a modulo counter C-198. The out-address R-196 is variable and is comprised of a combination of the in-address less a coarse time delay component of the time delay which is supplied by the central control system C-104 and the local control system C-210. In a preferred embodiment the coarse time delay represents the most significant bits (MSB) and the fine time delay represents the least significant bits (LSB) of a time delay word from the local control system C-210. In the preferred embodiment for bandwidth modes 1 to 4 and with $T_0=1/F_0$, the coarse time delay represents integer units of quarter cycles ($T_0/4$) of the receive signal nominal center frequency $F_0$ and the fine time delay (phase shift) represents a fractional value of a quarter cycle. For Bandwidth Modes 5 and 6 the coarse time delay represents integer units of three quarter cycles ($3T_0/4$) and the fine phase shift represents fractional values of three quarter cycles.

The memory R-152 is organized as a circular buffer which writes over the oldest stored data. The memory does not hold data for the entire scan or receive line, but just enough data to satisfy the span between the minimum and the maximum time delay that could be applied in order to select stored signal data. Thus, the necessity of having a much larger memory to store all the data from a scan line is avoided. In a preferred embodiment, the memory for each channel captures the most recent 256 data samples along a scan line at a rate of $4F_0$. The 256 data samples correspond, in a preferred embodiment, to a total delay range of 256x $T_0/4=$ $64T_0$ for Bandwidth Modes 1 to 4 and a total delay range of 256 $\times 3T_0/4=192T_0$ for Bandwidth Modes 5 and 6.

In FIGS. 6a, 6b and 6c, strings of data stored at times $t_{k-1}$, $t_k$, and $t_{k+1}$ are depicted for data on three receive channels for adjacent transducer elements (N-1, N, N+1). The FIGS. 6a, 6b and 6c thus represent a snapshot of the stored signals from three transducer elements frozen in time for the three specified times. Applying the appropriate time delay value along the time axis of the figures selects the desired data from the string of stored data. Dynamic focusing results from real time selection of time delay values in order to determine the data to be read out of the memory R-152. FIGS. 6a, 6b and 6c depict read out of samples of S3, S4 and S5 from the data sequences stored at time $t_k$ from the three channels at the selected time delays. Thus, the ability exists to dynamically select from the stored data samples according to the different time delay values in order to provide for dynamic focusing.

As can be seen in FIG. 7, applying different time delay profiles to the same data stored in the memory R-152 allows the receive beamformer processor R-120 to track and, as depicted, form two receive beams from the receive signals at each element.

More particularly, FIG. 7 schematically represents the manner that multiple beam data is selected from and read out of the memory R-152. Essentially interleaved time delay values from two or more time delay profiles at each desired range are applied to the same data stored in the memory R-152. Each time delay profile causes data corresponding to a different beam directed in a different direction to be retrieved from the memory and output over the data-out line R-192. Thus, the appropriate selection of time delay profiles causes data to be focused for different beams.

More particularly, FIG. 7 depicts a phased array transducer R-112 with transducer elements N-5 to N+4, R-114. Schematically, sequences of data R-200 (such as depicted in FIGS. 6a, 6b and 6c) which are stored in memory R-152 for each transducer element at time "t" are shown associated with the respective elements. Superimposed over the sequences of data are first and second time delay profiles R-202, R-204 representing profiles for first and second beams ($BM_1$, $BM_2$). By selecting the appropriate time delay values for each transducer element from the time delay profiles for each beam (as provided by the central and local control system), individual focal points R-206 of first and second beams can be formed from the appropriate data from each data sequence.

It is to be understood that the time delay profile can be dynamically changed for every instance in time. Thus, any desired beam which is contained in the data can be tracked and formed out of the data stored in memory R-152.

Further emphasizing the computational flexibility of this digital receive beamformer system and referring to Table 1, if it is assumed that a single beam has a nominal center frequency $F_0$ of 10 MHz, with a sampling rate $F_S$ of 40MHz, then only one dynamically focused beam could be formed with a $\lambda_0/2$ spatial range resolution (BW Mode 3). If, however, the beam had a center frequency of 5MHz, then there is sufficient computational bandwidth in the system such that two beams can be formed with $\lambda_0/2$ spatial range resolution (BW Mode 3). In a preferred embodiment, up to four time-interleaved data streams can be created from the data stored in memory R-152 by applying four sets of independent time delay profiles, one set for each beam. Other prior art systems are not as flexible and require a separate beamformer for each additional beam that is to be formed from data from the same transducer element. Such prior art systems do not have the ability to apply completely independent delay, phase and apodization values on a sample-by-sample basis for either single or multiple receive beams.

A further key advantage of this architecture is that up to and through the storage of receive signal data in the memory R-152, no distinction or segregation in the data is made between beams. Thus, all of the front end processing and amplification, the ADC operation and the computations by the decimator one, all of which are very computational intensive, as well as the process of storing data in the memory R-152 is done transparent to the number of beams in the receive signal. Were multiple beams individually tracked and identified earlier in the signal processing chain, then the computations in the decimator one, for example, would need to be run at a multiple of the number of beams times the present sampling rate. Thus, the present system affords a substantial hardware savings by not distinguishing between beams until the data is read out of memory R-152, and by efficient and maximum use of the computational capacity by a trade-off among the number of beams $N_B$ processed, the receive signal nominal center frequency $F_0$ for each beam, and the normalized per-beam relative spatial range resolution $\gamma_B/\lambda 0$.

d. Decimator Two

The second decimator, decimator two R-154, is programmable and has a filter and decimation structure (variable rate decimation filter) that is similar to decimator one R-150, but uses programmable complex filter coefficients h3 for the third filter R-167. The third filter acts as an anti-aliasing, complex band-pass filter and selects the positive image frequencies, and filters out negative image frequencies and out-of-band noise. This process of filtering and decimating in R-154 can also, in a preferred embodiment, demodulate the signal to or near baseband and convert the signal to a complex quadrature signal pair of I (in-phase) and Q (quadrature).

As discussed below, with respect to the preferred embodiment the data output from decimator two represents data from one, two or four beams, with the data representing two or four beams being time interleaved. As demonstrated in the Tables 1, 2 and 3, decimator two R-154 is where the receive sample bandwidth trade-off becomes most evident and the spatial range resolution is finally determined through the selection of the decimation factor $K_{D2}$.

Memory R-171 (FIG. 3) is programmable (as the term programmable is defined above) by central control C-104 with multiple complex filter coefficients and multiple decimator factors. The filter coefficients and decimator factors are programmed by the central control C-104 in accordance with the particular imaging task to be accomplished in the digital multi-channel receiver.

TABLE 3

DECIMATION FACTORS FOR DECIMATOR TWO

| Decimator Two Modes | $K_{D2}$ Decimation Factor | Decimator Two Output Rate $R_o$ |
|---|---|---|
| BW Mode 1 | 1 | $4F_0$ |
| BW Mode 2 | 2 | $2F_0$ |
| BW Mode 3 | 4 | $F_0$ |

TABLE 3-continued

DECIMATION FACTORS FOR DECIMATOR TWO

| Decimator Two Modes | $K_{D2}$ Decimation Factor | Decimator Two Output Rate $R_o$ |
|---|---|---|
| BW Mode 4 | 8 | $F_0/2$ |
| BW Mode 5 | 2 | $2F_0/3$ |
| BW Mode 6 | 4 | $F_0/3$ |

The relationship of the decimation factor of decimator two to the nominal center frequency $F_0$ defines the output sampling rate $R_o$ as set out in Table 3 where $K_{D2}=4F_0/R_o$ for Bandwidth Modes 1 to 4 and where $K_{D2}=4F_0/3R_o$ for Bandwidth Modes 5 and 6.

Accordingly, it is evident that as the decimation factor goes down to a smaller value, the sample rate per beam increases with the decimator two R-154 working at a constant full maximum capacity in all situations. Thus, this preferred embodiment uses decimator two R-154 in order to keep the computational rate at a maximum constant.

It is to be understood that the bypass modes of decimator two, as for decimator one, enables the isolation of decimator two for diagnostic purposes and/or when a signal with a wider bandwidth is desired. By way of example, for Bandwidth Mode 1, decimator two R-154 can be bypassed. Further, decimator two R-154 can be operated simply as a downsampler without performing a filtering operation.

From the above, it is evident that the beamformer processor R-120 decimates the signal to the lowest rate for maximum computational efficiency consistent with the number of beams utilized and spatial range resolution requirements.

Thus, it is evident that the above receive signal processing architecture provides for (1) a variable time delay memory, and (2) a second programmable decimator which affords the above advantage with respect to full and maximum signal processing computational bandwidth utilization. The relationship among (1) receive signal nominal center frequency $F_0$, (2) receive signal spatial range resolution $\gamma_B$, and (3) the number of simultaneously received beams $N_B$, can be programmed with decimation factors with respect to the decimators and in particular the second decimator, and with respect to the application of time delay values to the memory in order to distinguish between beams. Such advantages are independent of where signal demodulation occurs in the signal path.

e. Complex Multiplier

Complex multiplication to handle the complex phase rotation for fine time delay is very computational intensive; however, at this point in the signal path the signal is decimated down to the lowest sample rate in the signal path, and thus complex multiplication can be handled very efficiently.

The complex multiplier R-156 accomplishes true complex multiplication with a cross-multiplication as explained below.

In the complex multiplier R-156 signal demodulation to or near baseband occurs in order to account for verniering of $F_o$ to $F_0$. However, as explained above such demodulation to or near baseband, when for example there is no verniering of $F_o$, can occur at other locations in the signal path, such as decimator two, and be within the spirit and scope of the invention.

In the complex multiplier R-156, a weighting term which is a function of the apodization value and the focusing phase shift (corresponding to a fine time delay) is multiplied by the signal input from decimator two R-154. The apodization value and the phase shift value can change dynamically on a sample-by-sample, per receive processor, per beam basis. Thus, these values can dynamically vary across the aperture of the transducer as well dynamically vary in time (See FIGS. 5a, 5b, 5c and 11). These values are supplied by the central control system C-104, which is the subject of the above referenced patent application, and the local processor control C-210.

In FIG. 3, the preferred embodiment of the complex multiplier R-156 is conceptually shown with a complex I/O signal sample multiplied in multiplier R-210 by a complex phase value and real apodization value which are combined in a complex multiplier R-260. The complex multiplier R-210 is preferably accomplished by four real multiplication operations performed by a time shared Booth multiplier. Alternatively a separate phase multiplier and a separate apodization multiplier can be used in order to focus the signal. In yet another embodiment, the separate phase multiplier can be implemented with a Cordic multiplier, and the separate apodization multiplier can be implemented by a Booth multiplier.

The output of the complex multiplier R-156 is represented as follows:

$$Y = A\cos\phi \cdot I - A\sin\phi \cdot Q + j(A\cos\phi \cdot Q + A\sin\phi \cdot I)$$

where $I+jQ$ is the input channel sample signal to complex multiplier R-156, $A$ is the apodization value and $\phi$ is the phase shift value.

It is evident from the above and in particular with respect to the memory R-152 and complex multiplier R-156, that the present invention implements true dynamic focusing and dynamic apodization as each data sample per beam per receive processor can be modified dynamically with delay values, phase values and apodization values as supplied by the central control system and local processor control systems. Thus, the present invention is capable of using instantaneous delay, phase and apodization values calculated by the central control system for every data sample.

As indicated above, the complex multiplier as well as the rest of the functional blocks of FIG. 3 are preferably implemented in high speed digital hardware. It is within the spirit and scope of this invention, however, that such functional blocks as, for example, for the complex multiplier, can be implemented in software with general purpose microprocessors and in a different computational order and with different algorithms other than specified above. By way of example only, in the complex multiplier the apodization value could be multiplied after the complex I and Q multiplication occurs. Further, the prior art describes other methods of implementing a complex multiplier.

f. Focusing Filter

In another embodiment, the fine focusing delay can also be accomplished with a delay interpolator, such as a linear interpolation between the two samples closest to the desired delay. A generalization of the delay interpolator is a focusing filter, as described for filter-and-sum beamforming in section 6.2.5 of the text by Dudgeon and Mersereau (*Multichannel Digital Signal Processing*, Prentice Hall, 1985). Such a filter is programmed differently for each digital multichannel receive processor, and each waveform associated with each beam within a receive processor, to account for the desired signal-delay-versus-frequency characteristic needed to support receive beamformation. The filter will therefore generally have a nonlinear phase response. The focusing filter characteristics therefore contrast with the signal path filters associated with the decimation and demodulation operations which preferably have linear-phase responses (therefore yielding no distortion of signals in a filter's pass band) and which are typically set to identical characteristics in all receive processors. The decimator and demodulation operation filters are used for waveform shaping, not beamforming, and the same waveform (with appropriate delay and apodization) is normally created in all receive processors, although the invention supports selection of different filter characteristics among receive processors.

3. Per Channel Local Processor Control System

Secondary or local processor control C-210 (FIG. 3) for the digital multi-channel receiver R-101, receives control data from the primary or central control C-104. The secondary or local processor control C-210 includes a controller and I/O processor C-260, a calibration processor C-262, a memory address and delay processor C-264, a phase and frequency processor C-266, and an apodization processor C-268.

The local processor control C-210 is responsible for providing to the digital multi-channel receive processor R-120 frequency values (i.e. demodulation frequency, phase correction frequency, and receive signal nominal center frequency $F_0$, delay values, phase shift values, apodization values and calibration values per digital receive sample and per beam as discussed in detail below). The central control system C-104, as discussed in the above-referenced patent application, is responsible for providing to the local processor control C-210 the following: (1) filter coefficient programming (in line with the definition of programmable above), decimation factor programming, and calibration value programming per imaging mode, (2) frequency parameters as specified below per scan line and per beam, (3) delay and apodization values per dynamic range zone and per beam and (4) delay interpolation/extrapolation coefficients per sample. The local processor control C-210 also controls the sampling rate of the ADC R-118.

a. I/O Processor

With respect to the secondary or local control C-210, the controller and I/O processor C-260 controls all of the read and write operations.

b. Memory Address and Delay Processor

In a preferred embodiment, the memory address and delay processor C-264 calculates an interpolated and/or extrapolated delay value for each output sample of each beam of its associated beamformer processor R-120, using zone boundary delay values and the interpolation and/or extrapolation coefficients ($\alpha_{range}$) which are provided by the central control C-104 through a primary delay processor of a focus control C-132. The zone boundary delay values are defined for example by delay profiles (FIG. 5c) at specified range boundaries. The coefficients, $\alpha_{range}$, allow for interpolation (and/or extrapolation) in range between (and/or outbound of) the delay profile boundaries in order to increase the density of delay values between the range boundaries. As can be appreciated, each digital multi-channel receive processor R-120 has a memory address and delay processor C-264 associated with it in order to afford the dynamic focusing of the invention. For multiple beam operation, delay interpolations are time interleaved.

The delay processor C-264 performs local interpolation/ extrapolation in order to increase the density of the sparse, decimated delay profile data set communicated to the memory address and delay processor C-264 from the focus processor C-132 of the central control C-104. After the interpolation/extrapolation step in interpolator C-199 (FIG. 4), the delay value is divided with the most significant bits (coarse delay) being sent to the time delay memory R-152 in order to facilitate the selection of samples for desired beam or beams. The least significant bits (fine time delay) of the time delay value is sent to the phase and frequency processor C-266 where it is turned into a phase value as described more fully hereinbelow.

If selected, the architecture provides for a delay calibration value which can be added to the delay data prior to interpolation in interpolator C-199. The digital receive path delay calibration values from the calibration processor C-262 are supplied on line via C-195 to interpolator C-199.

Alternative embodiments can have less than a one- to-one relationship between beamformer processor R-120 and memory address and delay processor C-264 and be within the spirit of the invention. Further, such coefficients $\alpha_{range}$ can be locally generated by the memory address and delay processor C-264. Further it is to be understood that still different delay value generation schemes can be employed and be within the spirit of the invention. By way of example, an accumulator structure similar to accumulator C-272 of the local apodization processor C-268 can be used to generate appropriate delay values.

c. Phase and Frequency Processor

The phase and frequency processor C-266 (FIG. 3,8) of local or secondary control C-210 generates demodulation phase values (to, for example, account for the verniering of $F_o$ by the transmit beamformer system), and also phase shift correction values determined by the central control system C-104. The demodulation phase values are ideally calculated as an integration of the demodulation frequency (FIGS. 10a, 10b and 10c) generated from the frequency profile generator C-141. As hardware that accomplishes such integration is expensive, the demodulation phase values are preferably calculated as the sum of (1) a product, computed in multiplier C-140 of the demodulation frequency specification profiles $f_D(t)$ FIGS. 10d, 10e, and 10f, from the frequency profile generator C-141 and a demodulation reference time from the memory address and delay processor C-264 synchronized with the input of data to the delay memory R-152 and (2) a constant value added by adder C-141, as more fully explained below.

The fine focusing phase correction values, as computed in multiplier C-138, are the product of the instantaneous phase correction frequency $f_p(t)$ from the frequency profile generator C-141 (FIGS. 10a, 10b and 10c) and the residual or fine delay time (LSBs of delay time) from the memory address and delay processor C-264. Both the demodulation frequency and the phase correction frequency used in computing the focusing phase values are computed by choosing, in a preferred embodiment, one of the respective frequency profiles generated in the frequency profile generator C-141. The two phase values, the fine phase shift value and the demodulation phase value are added by summer C-142 and communicated to a look-up table C-144 where the phase value is converted into a complex I/Q value.

In a preferred embodiment all demodulation to or near baseband occurs in the complex multiplier. However, in other situations such as by way of example only, where there are frequency offsets, such demodulation can occur alternatively in decimator two through the use of complex filter coefficients with residual demodulation occurring in the complex multiplier. Such frequency offsets can, by way of example only, result when the carrier frequency is verniered from the receive signal nominal center frequency $F_0$ by the above referenced digital transmit beamformer system T-100. Such verniered center frequency can be the same for all beams transmitted from the transmit beamformer T-100 or different for each of multiple transmit beams.

The frequency for demodulation and for phase shift or rotation can be independently programmed in order to select one of the following three frequency-vs-time profiles:

(1) The frequency remains at a constant start frequency $F_{start}$ (generally the carrier frequency $F_c$) which is time independent as shown in FIG. 10a; or (2) The frequency is shifted down from the start frequency $(F_{start})$ by downshift slope $\Delta F_{downslope}$, until it either: (a) saturates at a constant limit frequency, $F_{limit}$, in one embodiment, or (b) reaches a specified time limit, $T_{break}$, and thereafter remains at a constant frequency as shown in FIG. 10b; or (3) The frequency is first shifted down from the start frequency, $F_{start}$, by a downshift slope, $\Delta F_{downslope}$, until it either: (a) saturates at a constant limit frequency, $F_{limit}$, in one embodiment, or (b) reaches a specified time limit, $T_{break}$, and thereafter is immediately shifted up by an upshift slope, $\Delta F_{upslope}$, until the frequency either: (a) saturates at the start frequency, $F_{start}$, or (b) is allowed to continue without saturating at the start frequency (FIG. 10c).

Both the demodulation frequency, $f_D(t)$, and the frequency $f_P(t)$ applied to generate the focusing phase shift value, can be selected from any of the above similar frequency profiles. Thus, the same profile can be applied to both multipliers C-138 and C-140. Different frequency profiles can also be applied to these multipliers and fall within the scope of the invention.

These profiles model frequency attenuation of ultrasound signals transmitted through tissue. Thus, for example, the longer that a broadband signal is propagated through tissue, the more that the center frequency of the signal will be downshifted due to such attenuation. In this embodiment, all the profiles began at frequency $F_{start}$. This frequency can be the carrier frequency $F_c$ of the receive beam. It is understood that although the transmit carrier frequency and the corresponding receive carrier frequency can be the same, there is no requirement that they are in fact the same. Accordingly, the start frequency of the frequency profiles can be that of the center frequency of the receive beamformer should it be different from that of the center frequency of the transmit beamformer. Accordingly $F_{start}$ can be any value. However, $F_{start}$ is preferably the transmit carrier frequency $F_c$ which is equal to the vernier factor times the center frequency, $vF_o$.

The parameters for defining the above frequency profiles are stored in the central control C-104. The frequency profile generator C-141 of the phase and frequency processor C-266 receives these parameters and calculates the frequency values on a receive- sample-by-receive-sample basis. These frequency values define the frequency profiles of FIGS. 10a, 10b and 10c.

For one embodiment, the parameters downloaded from the central control and programmed into the local control include the start frequency, the frequency limit, the frequency downslope, and the frequency upslope. As indicated above, the start frequency is generally the carrier frequency $F_c$. The frequency limit is the lowest frequency value used for the above calculations. It is understood that the numbers stored in the central control C-104 can be updated at any time based on new data which can, for example, be introduced and stored on the central control C-104 for example, from hard disk memory.

In another preferred embodiment, the downloaded parameters include the start frequency, the break time, $T_{break}$, the frequency downslope and the frequency upslope. In this embodiment, the downslope is limited not by a limit frequency but by time, $T_{break}$. Thus, the frequency profile in FIG. 10c is allowed to slope down until the $T_{break}$ has expired. At that point, the frequency profiles slopes up.

Preferably, the phase and frequency processor C-266 calculates all profiles simultaneously and then the central and/or local processor control selects the frequency profile, based on criteria pre-stored in the central control C-104, for each imaging mode, to calculate a demodulation phase value and a residual time delay phase value in order to provide the most optimally enhanced image.

Additionally, it is understood that in a multiple beam situation, each of the beams can be received with a different carrier frequency, $F_c$. The central processor could, for example, select different frequencies, slopes, and time limits for each of the beams in order to provide for an enhanced image. In such a situation, the start frequencies for each of the above three frequency profiles would depend upon the frequency for the particular beam formed by the beamformer processor. Thus the frequency profiles for each beam could be specified with entirely different parameters.

As indicated above, as preferably implemented, the demodulation phase value is the sum of (1) a product in multiplier C-140 of the demodulation frequency $f_D(t)$ (FIGS. 10d, 10e, and 10f) from the frequency profile generator C-141 and a demodulation reference time t from the memory address and delay processor C-264 and (2) a value added by adder C-141. If the reference time t is given by $0 \leq t \leq T_{break}$, then multiplexer C-143 causes t to be multiplied by $f_D(t)$ at multiplier C-140 and multiplexer C-145 causes a zero value to be added by adder C-141. Accordingly, the demodulation phase value is $f_D(t) \cdot t$. If, on the other hand, the reference time t is given by $T_{break} \leq it$ then multiplexer C-143 causes $t-T_{break}$ to be multiplied by $f_D(t)$ and multiplexer C-145 causes the constant value $f_D(T_{break}) \cdot T_{break}$ (see discontinuities in FIGS. 10e and 10f) to be added to the result. Accordingly, the demodulator phase value is $f_D(t) \cdot (t-T_{break}) + f_D(T_{break}) \cdot T_{break}$.

d. Apodization Processor

The apodization processor C-268 (FIG. 8) obtains a sparse table of range bounded apodization values from the focus processor C-132 of the central control C-104. Also obtained from the central control C-104 is the zone width $2^B$ between the range bounded apodization value, which zone width is specified by a value B. If one zone boundary apodization value is $A_1$ (FIG. 11) and the other zone boundary apodization value is $A_2$, then the accumulator C-272 (FIG. 8) of apodization processor C-268 can generate incremented apodization values between $A_1$ and $A_2$ by preferably adding $$\frac{A_2 - A_1}{2^B}$$

to the accumulated apodization values (with the starting value being $A_1$). Accordingly, apodization values are generated every $2^B$ intervals between $A_1$ and $A_2$ in order to fill out the sparse data set sent by the central control. This above operation is implicitly a linear interpolation. However, nonlinear techniques can also be implemented as well as extrapolation techniques.

Alternatively, it is to be understood that local apodization processor C-268 can internally calculate the interpolation/extrapolation range coefficients in a local range coefficient generator based on scan geometry parameters supplied from the central control C-104. These parameters define the particular scanning format that is being used. Further in still other embodiments such apodization interpolation/extrapolation coefficients can be pre-stored in the central control and downloaded to the local apodization processor.

The apodization processor C-268 calculates an interpolated/extrapolated apodization value for each output sample of each beam. To support multiple beam operation, the apodization processor C-268 interleaves interpolation/extrapolation calculations. As with the delay values, the apodization values, if desired, can be modified by supplying the apodization calibration values from the calibration processor before the apodization value is applied to the complex multiplier.

The complex value representation of the phase shift and the apodization values, multiplied together in multiplier R-260, are sent to the complex multiplier R-156 to be multiplied with the complex sample signal value.

e. Calibration Processor

The calibration processor C-262 is activated when a scan format or transducer is changed. During calibration, a common calibration signal from, for example, the transmit beamformer system T-100 is injected into all receive channels. The component tolerances in analog circuitry prior to digitization in ADC R-118 can result in analog-path-to-analog-path signal variances. The local calibration processor compares the output signal to a fixed calibration reference value which is stored in the local calibration processor. The local calibration processor computes delay and apodization correction values for the local control in order to drive the difference between the output signals and the reference signal to zero through an iterative process.

These correction values are sampled on an analog signal path basis and supplied by the calibration processor C-262, with respect to magnitude, to the apodization processor C-268 and, with respect to delay and phase, to the memory address and delay processor C-264.

For operations including, by way of example only, sliding aperture, random aperture and synthetic aperture, multiple fixed calibration reference values can be stored.

In addition to the above locally computed calibration values, calibration values can be downloaded from the central control. For example, calibration values for each type of transducer can be pre-stored in central control or provided to central control when a new transducer is selected. Such calibration values can then be downloaded to the local calibration processor to be combined with the locally generated calibration values, if appropriate.

4. Final Beamformation Processor (Baseband Multi-Beam Processor)

Figure 9:
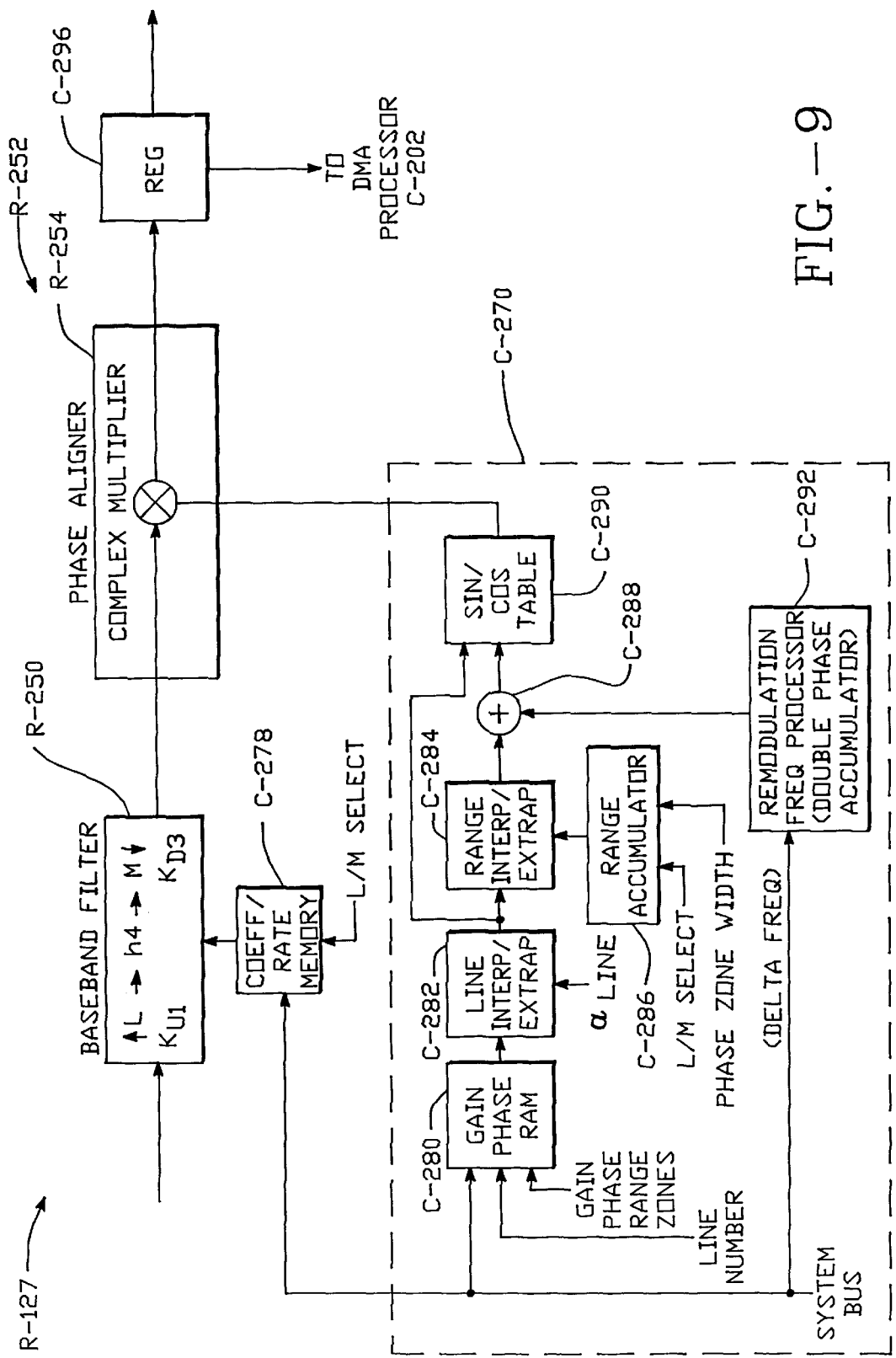
FIG. 9 is a block diagram schematic of an embodiment of a phase aligner of the invention which provides for phase alignment among receive scan lines in conjunction with a decimator, and a phase aligner (gain, phase and frequency) control processor.

The digital multi-channel receive processors R-120 are summed by summer R-126 and the results communicated to the baseband multi-beam processor R-125 (FIG. 2b) which comprises a baseband filter and phase aligner R-127 (FIGS. 2b, 3, 9) and a baseband processor control C-270 (FIGS. 2b, 3, 9).

a. Subarray Summer

As is known in the art, two standard methods to sum multiple inputs are parallel summation and sequential summation. The present embodiment combines aspects of these two approaches for a fast and efficient summation process. FIG. 2b depicts the summation process of the present digital receive beamformer system. Pairs of digital multi-channel receive processors R-120 are combined through parallel summation. Eight pairs of processors R-120 are sequentially summed by a subarray summer (subarray sums block R-126, FIG. 2b). The summers for this first summation step can be accomplished outside the processors R-120. Alternatively, the processors R-120 can include summers to effect this step.

After the above summation, then four such subarray sums are summed in parallel by a semi-final summer (final sums block R-126). Following this step is a parallel summation step where the sums from two semi-final summers are summed in parallel in final summer (sum block R-126). It is to be understood that alternative combinations of parallel and sequential summation techniques or all parallel summation or all sequential summation techniques could be used and be within the scope of this invention.

b. Baseband Filter and Phase Aligner

The complex baseband signal (or signals in the multiple beam case) from the digital multi-channel receive processors R-120 which represent the summation of all the signals from the elements sampled across the face of the transducer, is communicated to a baseband filter and phase aligner block R-127. Block R-127 includes a baseband filter R-250 (FIG. 9) which performs filtering and rational sample rate conversion (interpolation and decimation). Block R-127 also includes a phase aligner R-252 (FIG. 9) which provides for (1) scan-line-dependent and range-dependent phase adjustments of the signal required to correct for phase differences resulting from line-to-line apodization changes, scan geometry, and nonaligned effective transmit and receive origins, (2) remodulation (frequency alignment) of the signal to correct for phase differences resulting from different transmit frequencies per scan line, and (3) gain adjustment per scan line. The advantage of the use of a scan-line-to-scan-line variable frequency mode on transmit and receive beamformation is the reduction of grating lobes (see co-pending application entitled: METHOD AND APPARATUS FOR ADJUSTABLE FREQUENCY SCANNING IN ULTRASOUND IMAGING, which discusses a scan-line-to-scan-line variable frequency mode).

Such phase alignment and remodulation between desired scan lines and particularly two or more adjacent scan lines is, for example, for purposes of implementing coherent image processing techniques as described in the above co-pending application entitled: METHOD AND APPARATUS FOR COHERENT IMAGE FORMATION.

Thus, the purpose of the phase aligner is to maintain scan-line-to-scan-line coherency for (1) adjustable frequency operation, (2) synthetic scan line operation, as well as for (3) synthetic aperture operation, and (4) future operations on coherent beam samples.

Baseband filter R-250 preferably includes a multi-tap FIR filter which is programmable with both real and complex coefficients h4, and a rational sample rate converter. The rational sample rate converter includes an interpolator which has an integer upsampling factor L and a decimator with an integer down sampling factor M. Baseband filter R-250 accordingly accomplishes the following tasks.

First, baseband filter R-250 increases the signal-to-noise ratio by rejecting out-of-band noise frequencies, and/or maximizing the signal-to-noise ratio with a matched filter or quasi-matched filter design, preferably for matching to substantially Gaussian transmit pulses as well as pulses of other shapes. Gaussian pulses are especially useful as they represent waveforms that do not distort during transmission through attenuative media such as the body.

Second, baseband filter R-250 enables pulse equalization and shaping by compensating for both the transducer frequency response and the analog signal path prior to the ADC R-118.

Third, baseband filter R-250 performs a sample rate conversion (decimation function) based upon the rational (non-integer) decimation factor L/M (where L and M are integers). Accordingly, the sample rate is converted to a rate that is advantageous for an image display.

Examples of such decimation can be found in the references identified with the above discussion of decimator one and decimator two. The filter coefficients and non-integer decimation factors for baseband filter R-250 are programmed into baseband filter/phase aligner R-127 by being downloaded from the central control C-104 to coefficient and rate memory C-278. The downloaded coefficients and factors can be changed at any time by introducing new coefficients and factors into the central control C-104. The coefficients and factors stored in the coefficient and rate memory C-278 are selectable by the central control C-104 for programming the filter and decimation ratio L/M of the baseband filter R-250.

The complex multiplier R-254 of phase aligner R-252 operates in a manner similar to complex multiplier R-156 (FIG. 3).

Following complex multiplier R-254 is a register C-296 which stores scan line sample data so that it can be reported to the DMA processor C-202 of the central control C-104 for providing scan-line-to-scan-line calibration.

c. Baseband Processor Control

The phase aligner includes a control function which is contained in a baseband processor control C-270 (FIGS. 2b, 3, 9). In this baseband processor control C-270, a scan-line-to-scan-line or beam-to-beam gain adjustment value and a phase adjustment value are generated in a time interleaved manner. As discussed above, the phase correction value is the sum of the phase terms including: (1) a phase adjustment term required to correct for phase differences due to scan-line-to-scan-line apodization changes, and scan geometry which results in non-aligned effective transmit and receive origins (the scan-line-dependent and range-dependent phase adjustment term) and (2) a phase term required to remodulate the signal as though each line had used a common carrier frequency. As discussed herein and in copending U.S. patent applications entitled: METHOD AND APPARATUS FOR TRANSMIT BEAMFORMER SYSTEM and METHOD AND APPARATUS FOR ADJUSTABLE FREQUENCY SCANNING IN ULTRASOUND IMAGING, using a frequency scaling factor or frequency vernier factor, each beam can have a different carrier frequency. The phase aligner accordingly provides for remodulation between beams so that all beams are adjusted for differences in carrier frequencies.

In operation a source data set including scan format geometry parameters, sparse scan line gain and delay value, interpolation coefficient and non-integer decimation factors are downloaded from the central control C-104 to the baseband processor control C-270. Additionally, frequency parameters used in the frequency profile generator of the central control C-104 in accordance with FIGS. 10a, 10b and 10c are downloaded to the baseband processor control C-270.

The baseband processor control C-270 of FIG. 9 includes a gain and phase RAM C-280, a line interpolator C-282 which is supplied with pre-calculated and pre-stored line interpolation coefficients ($\alpha_{line}$) by the central control C-104, and a range interpolator C-284 with a range accumulator C-286, which is supplied with a rational decimation factor L/M and a phase zone width, both of which values are pre-calculated and pre-stored in the central control C-104. The rational decimation factor L/M is the same value supplied to the baseband filter R-250. Accumulator C-286 operates in the same manner as does accumulator C-272 of the local apodization processor C-268 (FIG. 8). Additionally as is known in the art a sample rate conversion in accordance with the rational decimation factor L/M is accomplished in order to match the sample data rate of the baseband filter R-250.

Alternatively the range interpolator/extrapolator C-284 can be supplied with programmable (as defined above) interpolation/extrapolation coefficients which are, by way of example, either (1) pre-calculated and pre-stored in or calculated by the central control or (2) calculated locally in baseband processor control C-270 by a coefficient generator.

The baseband processor control C-270 also includes a remodulation frequency processor C-292 which is preferably implemented as a double phase accumulator. The double phase accumulator calculates phase adjustment values to correct for line-to-line frequency differences and thus to remodulate the signal as though a common carrier frequency had been used across all scan lines.

From the central control C-104, pre-calculated and pre-stored values representing the frequency differences between scan lines (delta frequency values) are sent to the remodulation frequency processor C-292. These frequency difference values are based on frequencies and frequency slopes such as specified in FIGS. 10a, 10b and 10c. By way of example only, let it be assumed that the frequency profiles for two scan lines look like FIG. 10b but with different start frequency, $F_{start}$, values and different downshift slope, $\Delta F_{downslope}$, values. Accordingly, downloaded to baseband processor control C-270 from the central control for the two scan lines are the difference in frequencies between the scan lines and the difference in the rate of change of the frequency profiles over time. These values are calculated by the acquisition processor C-130 based on stored parameters and dependent upon the particular rational conversion factor L/M currently being used. The first accumulator of processor C-292 accumulates the difference in the rates of change of the frequency profiles over time between scan line while the second accumulator accumulates the difference in the frequencies between the scan lines over time. If there is no difference in the rate of change of the frequency profile over time, (i.e. the profile are the same exact for initially different $F_{start}$ values, or after $T_{break}$ in FIG. 10b when the slope goes to zero) the first accumulator performs no function. With no difference in the rate changes of the frequencies between the scan lines, only the second accumulator accumulates the frequency differences over time resulting in a corrective remodulation phase value.

The phase adjustment due to scan-line-to-scan-line apodization changes, scan geometry which results in non-aligned transmit and receive origins, and the phase adjustment due to remodulating the signal to an effective common carrier frequency are added in a summer C-288 and the summed phase value is then converted in a look-up table C-290 to sine and cosine representations. As part of the look-up table C-290 function, the gain is multiplied by the sine and cosine representations. This value is applied to complex multiplier R-252.

It is to be understood that other embodiments of the baseband processor control are possible within the scope of this invention.

As indicated above the phase aligner R-127 ensures that coherent signal and sample relationships are maintained between scan lines. The transmit samples and the echo or receive samples of the signals from beams are defined as being coherent when sufficient information is stored, preserved, or maintained to enable the samples of the return signals to be phase and amplitude corrected from scan-line-to-scan-line. The process of actually making the phase and amplitude corrections need not have yet taken place, as long as sufficient information with respect to a reference is maintained.

When a signal sample is processed coherently, the processing continues to maintain sufficient information to perform phase and amplitude correction at a later time. When two or more samples are processed coherently (e.g., coherently summed), the phase and amplitude corrections necessary for phase and amplitude alignment must have previously been performed.

Coherent processing of two or more signal samples yields significant benefits, such as being able to calculate synthetic samples, as described in the above co-pending application.

Due to the beamformer control C-104 specifying and accounting for all aspects of the transmit and receive signal, the entire system maintains all signal samples as coherent samples throughout the transmit and receive signal path, until the signal is finally detected in an operation which is external to beamformation.

It is to be understood that although scan-line-to-scan-line phase alignment is accomplished by baseband filter/phase aligner R-127 after beamformation, that such phase alignment can be provided prior to beamformation in the digital multi-channel receive processor R-120. By way of example, such phase alignment can be accomplished in each complex multiplier R-156 of each processor R-120.

5. Synthetic Aperture

Synthetic aperture, in the preferred embodiment of this invention, is characterized by: (1) partitioning the array of transducer elements into a plurality of independent or substantially independent subarrays for transmission and/or reception, each subarray consisting of multiple transducer elements; (2) executing a plurality of transmit/receive sequences with a subarray pair; (3) for each sequence, acquiring the coherent samples; and (4) combining, preferably by summation or weighted summation, all corresponding coherent samples. With such an arrangement, the number of transmit and/or receive electronic paths is effectively increased, and the transducer aperture on transmission and/or reception is increased.

Synthetic aperture scanning is described, for example, in Klahr U.S. Pat. No. 3,805,596, entitled: "High Resolution Ultrasonic Imaging Scanner," and in Saugeon U.S. Pat. No. 4,733,562, entitled: "Method And Apparatus For Ultrasonic Scanning Of An Object." Synthetic aperture scanning is also identified in Kino, "Acoustic Imaging for Nondestructive Evaluation," and Sutton, "Underwater Acoustic Imaging," both in Proceedings of the IEEE, Vol. 67, April 1979. All the above references are incorporated herein by reference.

The present digital receive beamformer system supports synthetic aperture operations. The calibration processor stores gain and phase corrections for the subarray receive apertures used in the synthetic aperture operations. The phase aligner maintains coherency of the separately received subarray receive aperture beams so that a summer can combine the signals to form a synthetic aperture scan line.

Further description of such synthetic aperture operation can be found in co-pending application entitled: METHOD AND APPARATUS FOR COHERENT IMAGE FORMATION.

The present invention provides significant enhancements over the prior art by providing for dynamic focal-point-to-focal-point time delay focusing and dynamic apodization of the image scanned across the aperture of the transducer and along the range direction.

This system further provides for multiple beam capacity with a single computational path for each of the digital multi-channel receive processors assigned to one or more transducer elements. The multiple beams superimposed in the data are not distinguished until late in the digital signal processing path affording further computational efficiencies. The present invention provides for trade-offs not available in the prior art allowing the full computational bandwidth of each digital signal path to be utilized. The trade-offs afforded are those among center frequency, spatial range resolution, and the number of beams selected.

The digital multi-channel receive processor R-120 has four main signal path functional components which are arranged in a novel order for among other reasons the above specified computational efficiencies. The processor R-120 includes first the decimator one, second the memory, third the decimator two, and fourth the complex multiplier which operate in the novel first through fourth order presented.

Due to this flexibility in the computational bandwidth, the present system is highly programmable and thus a wide variety of imaging applications and a wide variety of imaging transducers can be used with the system. For example, if high resolution is desired, then the system can be set for 10MHz operation with one beam in operation (Table 1) and a 10MHz transducer can be attached to the system. If, for example, a higher image frame rate is desired so that movement of an image, such as a heart valve, in real time can be observed, then the system can be set for, by way of example, four beams, each with a per beam center frequency of 2.5MHz. Such a higher frame rate would be beneficial for color Doppler imaging (F-mode) of moving body fluid such as blood. In such application resolution would not be as important as the ability to represent the fluid flow.

The present invention also includes a local processor control which can dynamically generate delay, phase apodization and calibration correction values for enhanced beamformer performance.

The invention further includes a phase aligner for correcting phase post-beamformation on a beam-to-beam basis. Further, the entire system ensures that the samples are maintained in a coherent manner.

While the present embodiment has been described with respect to reflective or echo receive signals, the present system could as well be operable with transmission imaging having receive signals that pass through the object to be imaged.

Other objects, aspects and advantages of the invention can be ascertained from the figures and claims appended.

It is to be understood that other embodiments of the present invention can be fabricated and fall within the spirit and scope of the invention.

We claim:

1. An ultrasound receive beamformer comprising:
an adjustable resolution digital processor for processing a signal which is used to construct N receive beams, where N is a variable positive integer;
said digital processor comprising means for adjusting resolution of said signal as a function of N in order to utilize overall digital processing capability of the digital processor.

2. The beamformer of claim 1
wherein said adjusting means comprises means to adjust spatial range resolution as a function of N.

3. The beamformer of claim 2 wherein
said adjusting means comprises means to adjust spatial range resolution relative to a number of concurrent receive beams per transmit event and the nominal center frequency of each receive beam.

4. The beamformer of claim 1
in which said digital processor includes a decimator for downsampling said signal depending on a selected resolution.

5. The beamformer of claim 1
in which said adjusting means is operative to adjust the resolution of said signal dependent additionally on a nominal center frequency of the signal.

6. The beamformer of claim 1 wherein:
said digital processor processes samples of said signal to construct components of at least one receive beam in a single processor, associating each beam with a channel in said processor.

7. The beamformer of claim 1 wherein:
said digital processor includes a multiplicity of digital multi-channel receive processors with each digital multi-channel receive processor processing samples of said signal to construct components of at least one receive beam, associating each receive beam with a channel in said digital multi-channel receive processor.

8. The beamformer of claim 1
wherein said adjusting means comprises means to adjust the resolution of said signal depending on the number N of beams which are formed from said signal in order to utilize full performance of the processor.

9. An ultrasound receive beamformer comprising:
a variable resolution digital processor for processing a signal which is used to construct at least one receive beam, said signal characterized by a variable nominal center frequency;
said digital processor comprising means for adjusting resolution of the signal as a function of the nominal center frequency in order to utilize overall digital processing capability of the digital processor.

10. The beamformer of claim 9 wherein:
each of said receive beams is associated with a carrier frequency derived from the common nominal center frequency; and
said adjusting means is operative to adjust the resolution of said signal depending on the nominal center frequency.

11. The beamformer of claim 9 wherein:
said adjusting means is operative to process samples of said signal to construct components of at least one receive beam in a processor, associating each beam with a channel in said processor.

12. The beamformer of claim 9 wherein:
said digital processor includes a multiplicity of digital multi-channel receive processors with each digital multi-channel receive processor processing samples of said signal to construct components of at least one receive beam, associating each beam with a channel in said processor.

13. An ultrasound receive beamformer for receiving a signal from a transducer array which is used to construct at least two beams, said beamformer comprising:
  a memory for storing a first set of data samples representative of the signal received during a first time interval from the transducer array, which stored data samples make no distinction between the at least two beams;
  said memory including means for applying a different set of time delay values associated with each beam to the first set of data samples stored in the memory to provide reconstructed data samples which distinguish between the at least two beams.

14. The beamformer of claim 13 wherein
  said memory outputs the reconstructed data samples in an interleaved manner.

15. The beamformer of claim 13 further comprising:
  a decimator for further processing the reconstructed data samples of the beams in an interleaved manner.

16. The beamformer of claim 13 further comprising:
  a decimator for further processing the reconstructed data samples of the beams in a time multiplexed manner such that overall computational capability of the decimator is utilized; and further in which
  said decimator downsamples the reconstructed data samples depending on at least one of a number of beams being processed, spatial range resolution desired for each beam, and a nominal center frequency.

17. The beamformer of claim 13 further comprising:
  a decimator for downsampling the reconstructed data samples; and
  a phase rotator for applying a phase rotation to the reconstructed data samples.

18. The beamformer of claim 17 including:
  a unit for apodizing the reconstructed data samples.

19. The beamformer of claim 13 including:
  a decimator for further processing the reconstructed data samples of the beams such that overall computational capacity of said beamformer is utilized; and further in which
  said decimator downsamples the reconstructed data samples depending on at least one of a number of beams being processed, spatial range resolution desired for each beam, and a nominal center frequency.

20. A method for processing a received and digitized signal representative of a waveform sensed by elements of an ultrasound transducer array comprising the steps of:
  processing separately the received and digitized signal representative of the waveform sensed by each element of the ultrasound transducer array; and
  adjusting processed resolution of the received and digitized signal in response to a variable indicative of a number of beams which are formed from the received and digitized signal in order to utilize overall processing capability of the processing step.

21. The method of claim 20
  in which said adjusting step further comprises the step of adjusting a spatial range resolution of the received and digitized signal depending on a number of beams which are formed from the received and digitized signal.

22. The method of claim 20
  in which said adjusting step further comprises downsampling the digital signal depending on a number of beams which are formed from the digitized signal.

23. A method for processing a received and sampled signal representative of a waveform sensed by elements of an ultrasound transducer array comprising the steps of:
  processing separately the received and sampled signal representative of the waveform sensed by each element of the ultrasound transducer array; and
  adjusting processed resolution of the received and sampled signal in response to a variable indicative of a nominal center frequency of the received and sampled signal in order to utilize overall processing capability associated with the processing step.

24. The method of claim 23 wherein said signal is used to form at least one beam, and further wherein said beam is associated with a carrier frequency derived from a common nominal center frequency, the method further comprising:
  adjusting the resolution of the received and sampled signal depending upon the nominal center frequency.

25. The method of claim 23 wherein the adjusting step includes:
  adjusting a spatial range resolution of the received and sampled signal.

26. A method for processing a received and digitized signal representative of a waveform which is used to construct at least two beams sensed by elements of an ultrasound transducer array comprising the steps of:
  storing a first set of data samples representative of the signal received during a first time interval from the ultrasound transducer array, which stored first set of data samples makes no distinction between the at least two beams being constructed;
  applying a different set of time delay values associated with each beam to the stored first set of data samples to provide reconstructed data samples which distinguish between the at least two beams being constructed.

27. The method of claim 26 further comprising:
  processing the reconstructed data samples of the beams being constructed such that an overall computational capability for such processing is utilized; and
  downsampling the reconstructed data samples depending on a number of beams being processed and a resolution desired for the processed signal.

28. The method of claim 26 further comprising
  the step of performing at least one of filtering and downsampling the reconstructed data samples; and
  applying a phase rotation to the reconstructed data samples.

29. The method of claim 28 wherein
  said step of downsampling the reconstructed data samples is further characterized as downsampling the signal depending on a number of beams represented by the reconstructed signal and a resolution desired for the processed signal.

30. The method of claim 28 including:
  apodizing the reconstructed data samples.

31. The method of claim 26 in which processing of the reconstructed data samples of the beams is performed in manner such that an overall computational capacity is utilized; and
  downsampling the reconstructed data samples depending upon a resolution desired for the processed signal.

32. The method of claim 26 further comprising
  the step of selectively downsampling the reconstructed data samples depending upon on resolution desired for the processed signal.

33. The method of claim 26 further comprising:
  downsampling the reconstructed data samples depending on a number of beams being processed.

* * * * *

UNITED STATES PATENT AND TRADEMARK OFFICE
CERTIFICATE OF CORRECTION

PATENT NO. : 5,827,188
DATED : October 27, 1998
INVENTOR(S) : J. Nelson Wright et al.

It is certified that error appears in the above-indentified patent and that said Letters Patent is hereby corrected as shown below:

In column 2, line 36, replace "IEE" with --IEEE--.

In column 12, line 64, delete "the".

In column 15, line 37, after "System" start a new paragraph starting with "The".

In column 19, line 22, replace "hi" with --h1--.

In column 19, line 35, replace "(FADC)" with --$(F_{ADC})$.--

In column 20, line 19, replace "$F_0$" (second occurrence) with --$F_C$--.

In column 23, line 26, replace "$\gamma_B/\lambda 0$" with --$\gamma_B/\lambda_0$--.

In column 24, line 63, replace "$F_0$" (second occurrence) with --$F_C$--.

In column 25, line 8, after "well" insert --as--.

In column 29, line 41, replace "$f_D(t)$ t." with --$f_D(t) \bullet t$.--

UNITED STATES PATENT AND TRADEMARK OFFICE
CERTIFICATE OF CORRECTION

PATENT NO. : 5,827,188
DATED : October 27, 1998
INVENTOR(S) : J. Nelson Wright et al.

It is certified that error appears in the above-indentified patent and that said Letters Patent is hereby corrected as shown below:

In column 29, line 42, replace "$T_{break} \leq it$" with --$T_{break} \leq t$--.

<u>In the Claims</u>

In claim 32, line 3, delete "on".

Signed and Sealed this

Fourteenth Day of December, 1999

*Attest:*

Q. TODD DICKINSON

*Attesting Officer*    *Acting Commissioner of Patents and Trademarks*